United States Patent
Delisle-Simard et al.

(10) Patent No.: US 11,422,394 B2
(45) Date of Patent: Aug. 23, 2022

(54) SILICON-BASED MODULATOR WITH OPTIMIZED LONGITUDINAL DOPING PROFILES

(71) Applicant: Ciena Corporation, Hanover, MD (US)

(72) Inventors: Alexandre Delisle-Simard, Québec (CA); Yves Painchaud, Québec (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/609,239

(22) PCT Filed: Jan. 25, 2019

(86) PCT No.: PCT/US2019/015258
§ 371 (c)(1),
(2) Date: Oct. 29, 2019

(87) PCT Pub. No.: WO2019/148011
PCT Pub. Date: Aug. 1, 2019

(65) Prior Publication Data
US 2020/0192131 A1    Jun. 18, 2020

Related U.S. Application Data

(60) Provisional application No. 62/712,659, filed on Jul. 31, 2018, provisional application No. 62/622,494, filed on Jan. 26, 2018.

(51) Int. Cl.
*G02F 1/025*    (2006.01)
*G02F 1/015*    (2006.01)

(52) U.S. Cl.
CPC ............ *G02F 1/025* (2013.01); *G02F 1/0156* (2021.01); *G02F 2202/06* (2013.01); *G02F 2202/105* (2013.01)

(58) Field of Classification Search
CPC ........ G02F 1/025; G02F 1/017; G02F 1/0156; G02F 1/01708; G02F 2202/06; G02F 2202/105
See application file for complete search history.

(56) References Cited

U.S. PATENT DOCUMENTS 6,298,177 B1   10/2001  House
7,085,443 B1   8/2006   Gunn, III et al.
(Continued)

OTHER PUBLICATIONS

Apr. 11, 2019 International Search Report and Written Opinion for International Application No. PCT/US2019/015258.

*Primary Examiner* — Thomas A Hollweg
*Assistant Examiner* — Mary A El-Shammaa
(74) *Attorney, Agent, or Firm* — Clements Bernard Baratta; Lawrence A. Baratta, Jr.; Christopher L. Bernard

(57) ABSTRACT

A silicon modulator where the doping profile varies along the lateral and/or longitudinal position in the transition zones to achieve improved performance in terms of optical attenuation or contact access resistance or both. A modulator includes a core; a first transition zone that is a P-side region adjacent to the waveguide core, the first transition zone has a first longitudinal doping profile; and a second transition zone that is an N-side region adjacent to the core on an opposite side as the first transition region, the second transition zone has a second longitudinal doping profile; the first longitudinal doping profile has a variation of doping concentration along a longitudinal direction in the first transition region to mimic a first lateral doping profile, and the second longitudinal doping profile has a variation of doping concentration along a longitudinal direction in the second transition region to mimic a second lateral doping profile.

20 Claims, 34 Drawing Sheets

(56) References Cited

U.S. PATENT DOCUMENTS

2011/0222812 A1    9/2011    Webster et al.
2015/0212345 A1    7/2015    Chen et al.

11a)  11b)  11c)  11d)

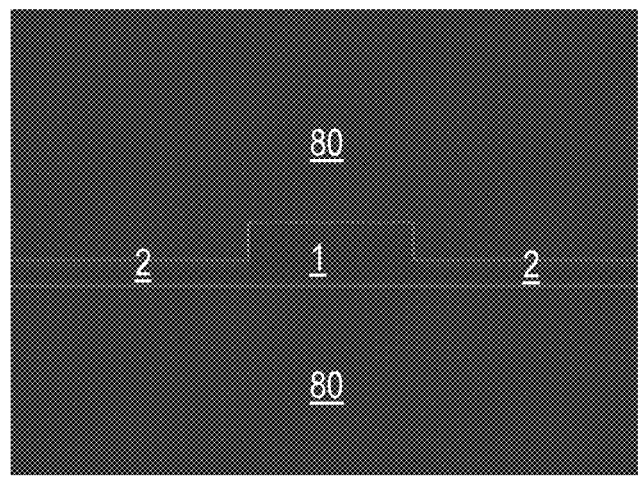
FIG. 35
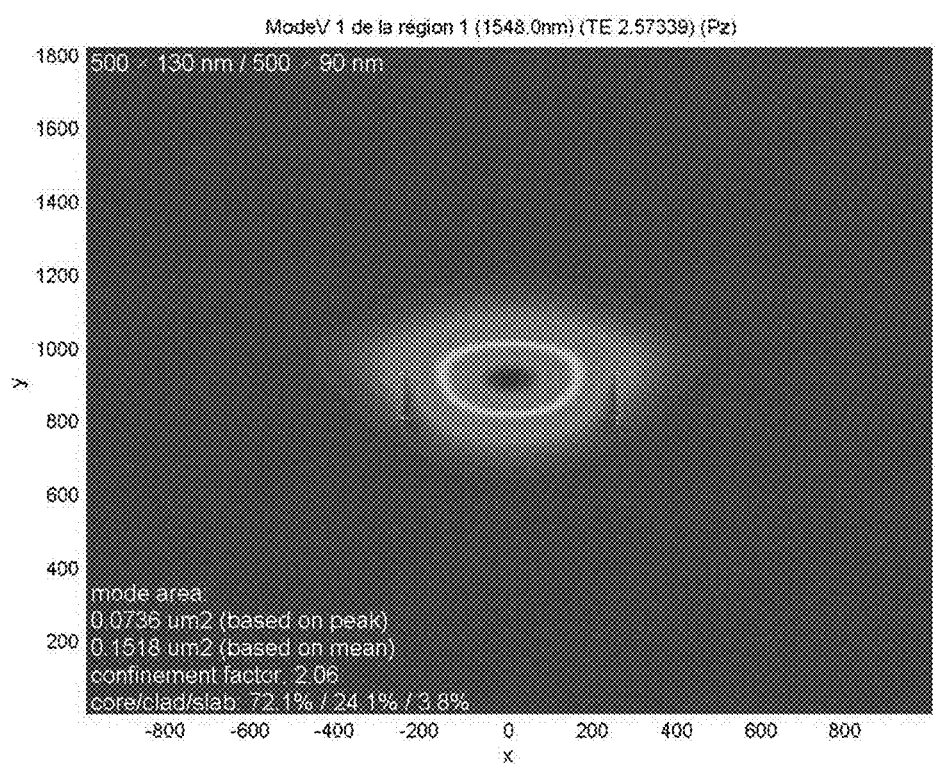

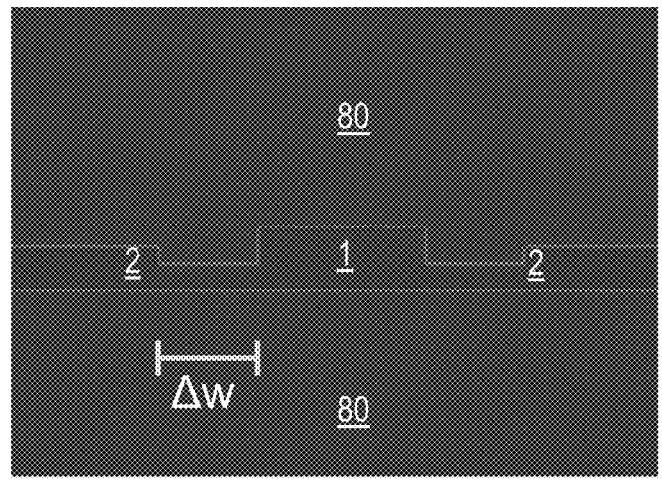
FIG. 36
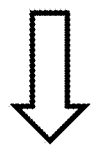
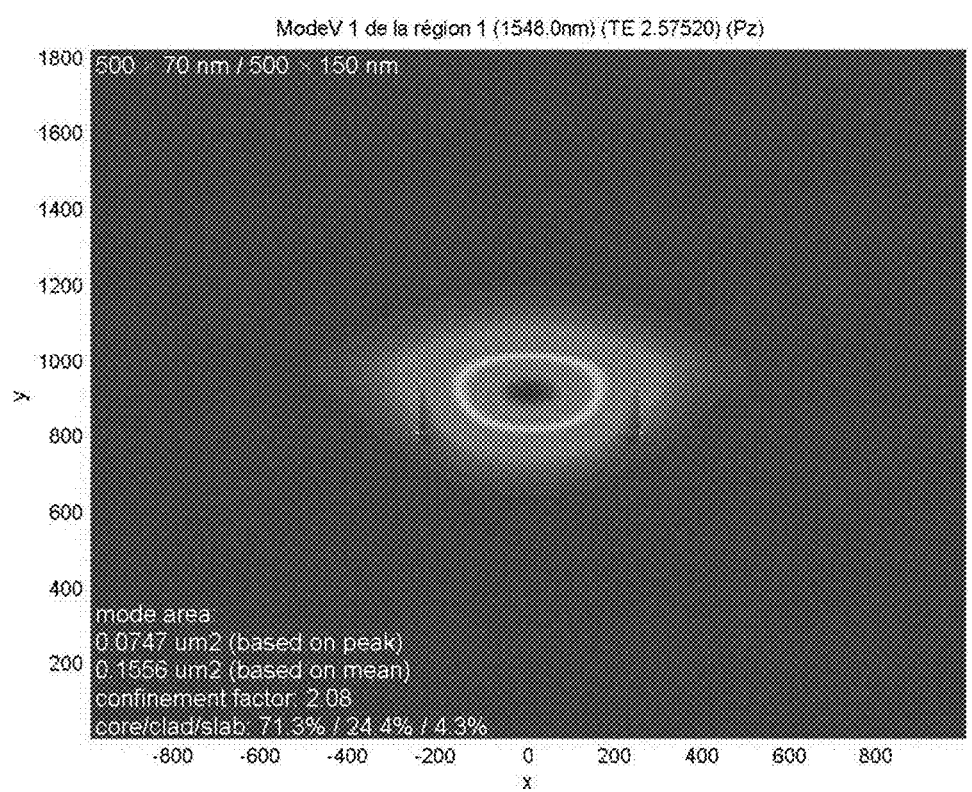

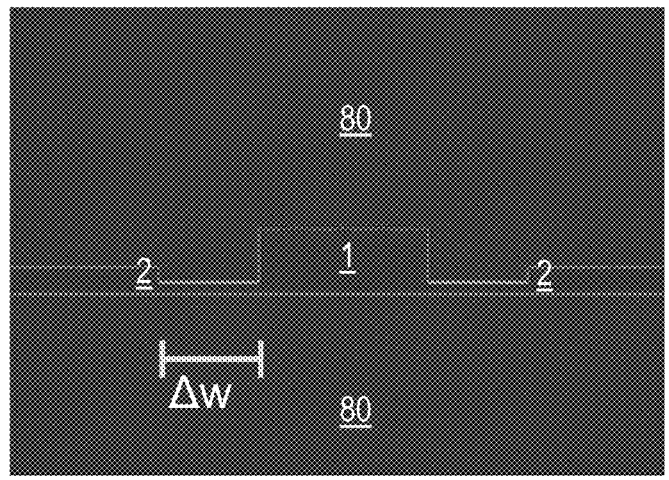
FIG. 37
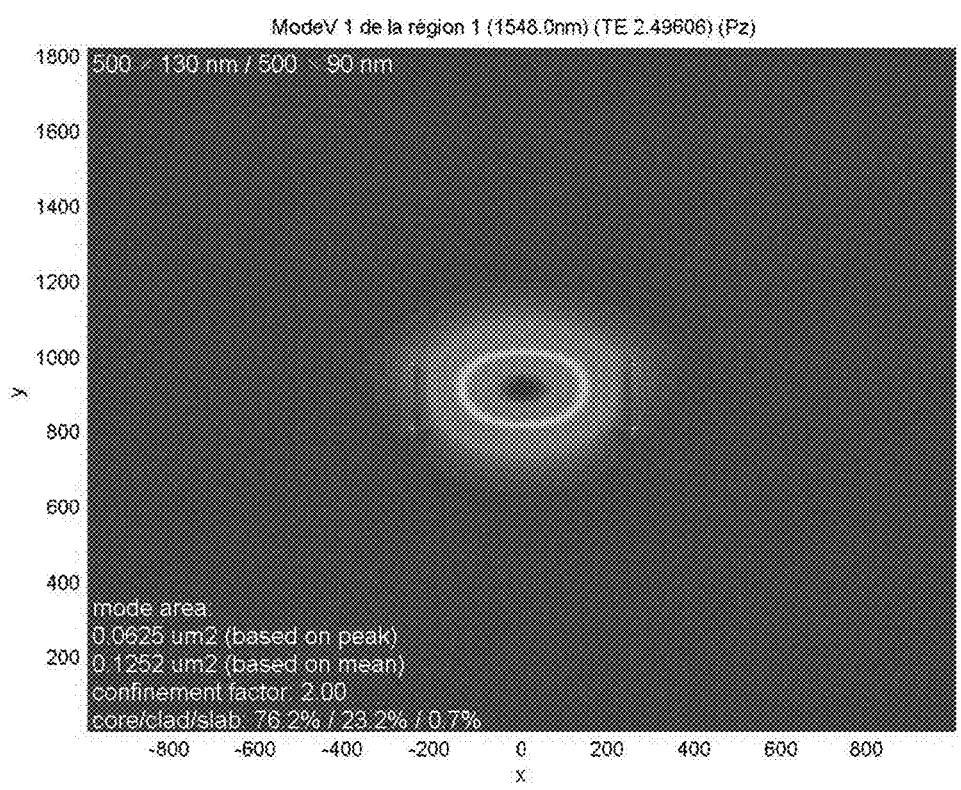

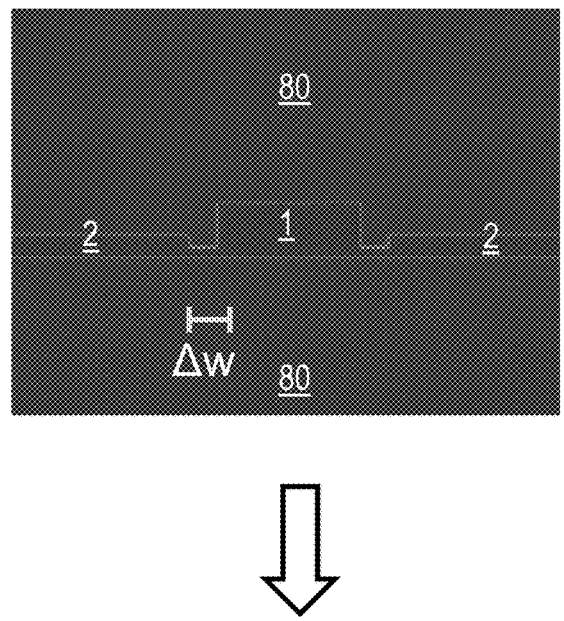
FIG. 38
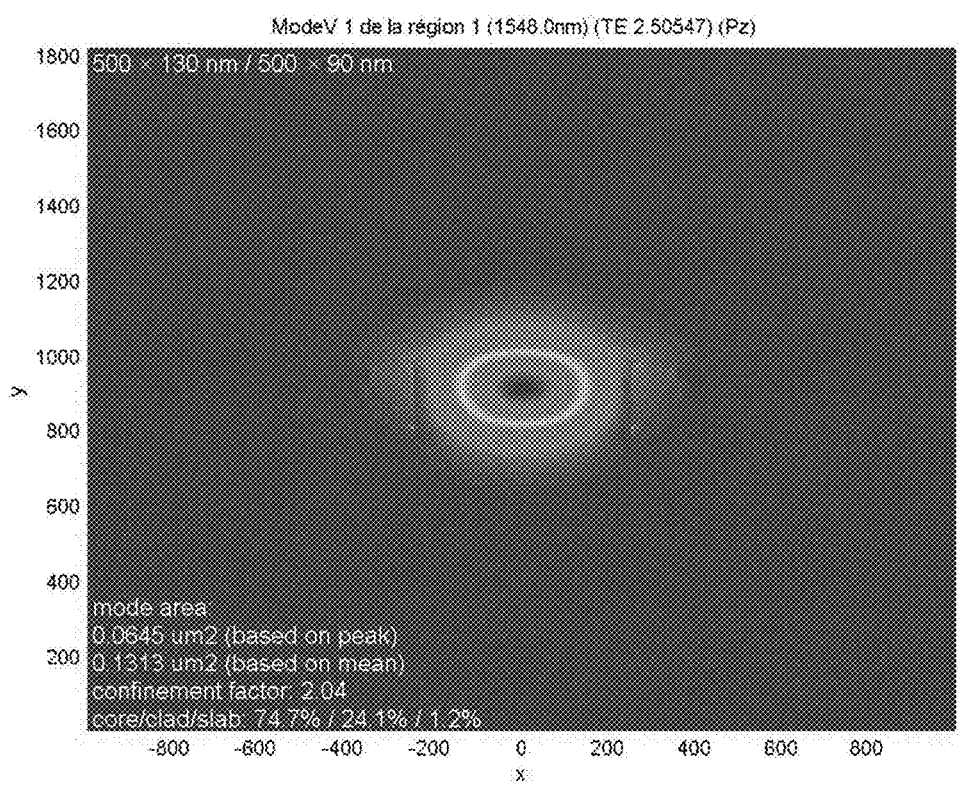

SILICON-BASED MODULATOR WITH OPTIMIZED LONGITUDINAL DOPING PROFILES

CROSS-REFERENCE TO RELATED APPLICATION(S)

The present disclosure is a national stage of PCT Application No. PCT/US19/015258, filed Jan. 25, 2019, and entitled "SILICON-BASED MODULATOR WITH OPTIMIZED DOPING PROFILES AND DIFFERENT TRANSITION ZONE THICKNESSES," which claims priority to U.S. Provisional Patent Application No. 62/622,494, filed Jan. 26, 2018, and entitled "SILICON MODULATOR WITH OPTIMIZED DOPING PROFILE AND REDUCED CONTACT RESISTANCE," and to U.S. Provisional Patent Application No. 62/712,659, filed Jul. 31, 2018, and entitled "SILICON-BASED MODULATOR WITH REDUCED CONTACT RESISTANCE," the contents of each are incorporated by reference herein.

FIELD OF THE DISCLOSURE

The present disclosure generally relates to optical communications. More particularly, the present disclosure relates to a silicon-based modulator with an optimized lateral doping profile in a transition region, an optimized longitudinal doping profile in the transition region, and variable slab thickness in the transition region for reduced access resistance.

BACKGROUND OF THE DISCLOSURE

Silicon-based modulators are widely used in optical communication systems. It is well known in the art that silicon modulators can be based on the use of a PN junction in a ridge waveguide. Such a waveguide is formed by providing a thick silicon waveguide core region (200 to 250 nm thick, for example) surrounded by a thin slab (around 100 nm thick, for example). The PN junction is typically formed laterally by doping one side of the waveguide with an N-type dopant, and the other side with a P-type dopant. The P and N regions are electrically connected on respective sides to electrodes.

The doping concentration of the silicon in the waveguide core region has to be weak, typically in the range of $1\times10^{17}$ to $1\times10^{18}$ cm$^{-3}$, in order to avoid excessive optical loss. The doping concentration near the electrodes has to be high, typically in the range of $1\times10^{20}$ to $1\times10^{21}$ cm$^{-3}$, in order to permit a good ohmic contact to electrodes. On each side of the PN junction, there is a transition zone connecting the weakly-doped region and the heavily-doped region. It is known in the art to use an intermediate doping level in the transition zone, forming a three-step profile, in order to adjust the compromise between optical loss and contact resistance. One, two or three uniformly doped sections may be used in this transition zone, see, for example, FIG. 1. Each of these doped sections is uniform both in term of their vertical doping concentration profile and in term of the silicon waveguide geometry (e.g., height). Therefore, this doping profile is invariant within each doped section in the lateral direction (i.e., the direction between the junction and each electrode) in the device.

BRIEF SUMMARY OF THE DISCLOSURE

In an embodiment, a silicon-based modulator (10) includes a waveguide core (1) that is a PN junction region (12); a first transition zone (2) that is a P-side region (16) adjacent to the waveguide core (1) in a lateral direction; a second transition zone (2) that is an N-side region (16) adjacent to the waveguide core (1) in a lateral direction and on an opposite side as the first transition zone (2); a first electrical contact region (3) adjacent to the first transition zone (2); and a second electrical contact region (3) adjacent to the second transition zone (2), wherein at least one of the first transition zone and the second transition zone has a variation of doping concentration along a longitudinal direction. The variation of doping concentration can be formed by a plurality of areas of different doping concentrations in the longitudinal direction. The variation of doping concentration can result in one of lower optical losses for a given access resistance and lower access resistance for a given optical loss. The waveguide core can have a p-type doping of p and the first electrical contact has a p-type doping of p++ such that the first transition zone has k (k≥2) divisions $P_1$, $P_2$, ... $P_k$, each division effectively doped at a concentration level $p_1$, $p_2$, ... $p_k$, respectively, such that $p \leq p_1 < p_2 ... < p_k \leq p++$, and the waveguide core can have an n-type doping of n and the second electrical contact has an n-type doping of n++ such that the second transition zone has k (k≥2) divisions $N_1$, $N_2$, ... $N_k$, each division effectively doped at a concentration level $n_1$, $n_2$, ... $n_k$, respectively, such that $n \leq n_1 < n_2 ... < n_k \leq n++$.

The variation of doping concentration can be different in the first transition zone (2) and the second transition zone (2). The variation of doping concentration can be periodic in the longitudinal direction. The doping concentration in the at least one of the first transition zone (2) and the second transition zone (2), adjacent to the corresponding electrical contact region (3), can be equal therewith. The doping concentration in the at least one of the first transition zone (2) and the second transition zone (2), adjacent to the waveguide core (1), can be equal therewith. At least one of the first transition zone (2) and the second transition zone (2) can have a variable thickness between the wavelength core (1) and the corresponding electrical contact region (3), wherein the variable thickness reduces access resistance relative to a uniform thickness. The variation of doping concentration in a longitudinal direction can result in an effective lateral doping profile that increases exponentially as a function of distance from the wavelength core (3). At least one of the first transition zone (2) and the second transition zone (2) can have a variation of doping concentration along a lateral direction. A doping value in the variation of doping concentration along the lateral direction can have a maximum value of a doping value in the corresponding electrical contact region (3). A doping value in the variation of doping concentration along the lateral direction can have a maximum value of a doping value in the corresponding electrical contact region (3). A doping value in the variation of doping concentration along the lateral direction can be between a doping value in the wavelength core (1) to another doping value in the corresponding electrical contact region (3).

In another embodiment, a silicon-based modulator (10) is obtained by a process including the steps of: determining an input profile for lateral doping in a transition region (2) in the silicon-based modulator (10), the transition region is between a waveguide core (1) and an electrical contact region (3), the input profile for the transition region (2) is uniformly doped in an optical propagation direction that is a longitudinal direction and has variation in doing along a lateral direction; defining a number of implantation steps and associated dopant concentrations; and, at each position along the lateral direction, determining an output profile dopant in the longitudinal direction such that its average is equal a dopant concentration of the input profile at a same lateral position.

In another embodiment, a silicon-based modulator with an optimized lateral profile includes a waveguide core that is a PN junction region; a first transition zone that is a P-side region adjacent to the waveguide core, the first transition zone has a first lateral doping profile; a second transition zone that is an N-side region adjacent to the waveguide core on an opposite side as the first transition region, the second transition zone has a second lateral doping profile; a first electrical contact region adjacent to the first transition zone; and a second electrical contact region adjacent to the second transition zone, wherein at least one of the first lateral doping profile and the second lateral doping profile varies laterally from a first doping value in the wavelength core to a second doping value in the corresponding electrical contact region. A doping value in one or more of the first lateral doping profile and the second lateral doping profile can increase exponentially as a function of distance from the wavelength core. A doping value in one or more of the first lateral doping profile and the second lateral doping profile can have a maximum value of the second doping value in the corresponding electrical contact region. A doping value in at least one of the first lateral doping profile and the second lateral doping profile can be between the first doping value in the wavelength core to the second doping value in the corresponding electrical contact region. One or more of the first lateral doping profile and the second lateral doping profile can be set based on lower optical losses for a given access resistance or for lower access resistance based on a given optical loss. The first lateral doping profile and the second lateral doping profile can be different.

In another embodiment, a silicon-based modulator with an optimized lateral profile is formed by a process including the steps of: performing strong dopant implantation at a first electrical contact region adjacent to a first transition zone and at a second electrical contact region adjacent to a second transition zone; performing a long annealing process to both activate and diffuse ions in the first electrical contact region and the second electrical contact region; performing weak dopant implantation, relative to the strong dopant implantation, at a waveguide core; and performing a short annealing process, relative to the long annealing process, to activate the weak dopant implantation, each annealing process includes an increase of temperature for a short period of time that allows dopant ions to integrate into a crystalline structure and become activated, wherein the long annealing process and the short annealing process, in each of the first transition zone and the second transition zone, cause a doping profile from the wavelength core to the corresponding electrical contact region that varies laterally.

In a further embodiment, a silicon-based modulator with an optimized longitudinal profile includes a waveguide core that is a PN junction region; a first transition zone that is a P-side region adjacent to the waveguide core, the first transition zone has a first longitudinal doping profile; a second transition zone that is an N-side region adjacent to the waveguide core on an opposite side as the first transition region, the second transition zone has a second longitudinal doping profile; a first electrical contact region adjacent to the first transition zone; and a second electrical contact region adjacent to the second transition zone, wherein the first longitudinal doping profile has a variation of doping concentration along a longitudinal direction in the first transition region to mimic a first lateral doping profile. The silicon-based modulator of claim 1, wherein the first longitudinal doping profile can be formed by uniformly-doped areas with different shapes in the longitudinal direction. The first lateral doping profile can be determined based on lower optical losses for a given access resistance or for based on lower access resistance for a given optical loss.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 35-38 illustrate cross-sectional diagrams of various modulators with the waveguide core and the transition regions and associated calculated optical mode illustrating different slab thicknesses in the transition regions in accordance with one or more embodiments.

DETAILED DESCRIPTION OF THE DISCLOSURE

Embodiments disclosed herein relate to design of a silicon-based modulator. Specifically, embodiments disclosed herein describe a novel silicon modulator where the doping profile varies along the lateral and/or longitudinal position in the transition zones to achieve improved performance in terms of either optical attenuation or contact access resistance or both. In embodiments disclosed herein, the silicon modulator may include a waveguide having a core and a transition zone between the core and electrodes on either side of the waveguide, where the shape of the transition zone is varied to achieve an improved performance. The shape of the transition zone may include, for example, a height (i.e., a thickness) of the transition zone. As described herein, access resistance describes the resistance between the external world and the modulating PN junction (waveguide core).

Although silicon is the material widely used in modulators for optical communications, it would be readily appreciated by one skilled in the art that the subject matter disclosed in this document may be applicable to modulators based on other semiconductor materials.

Figure 1:
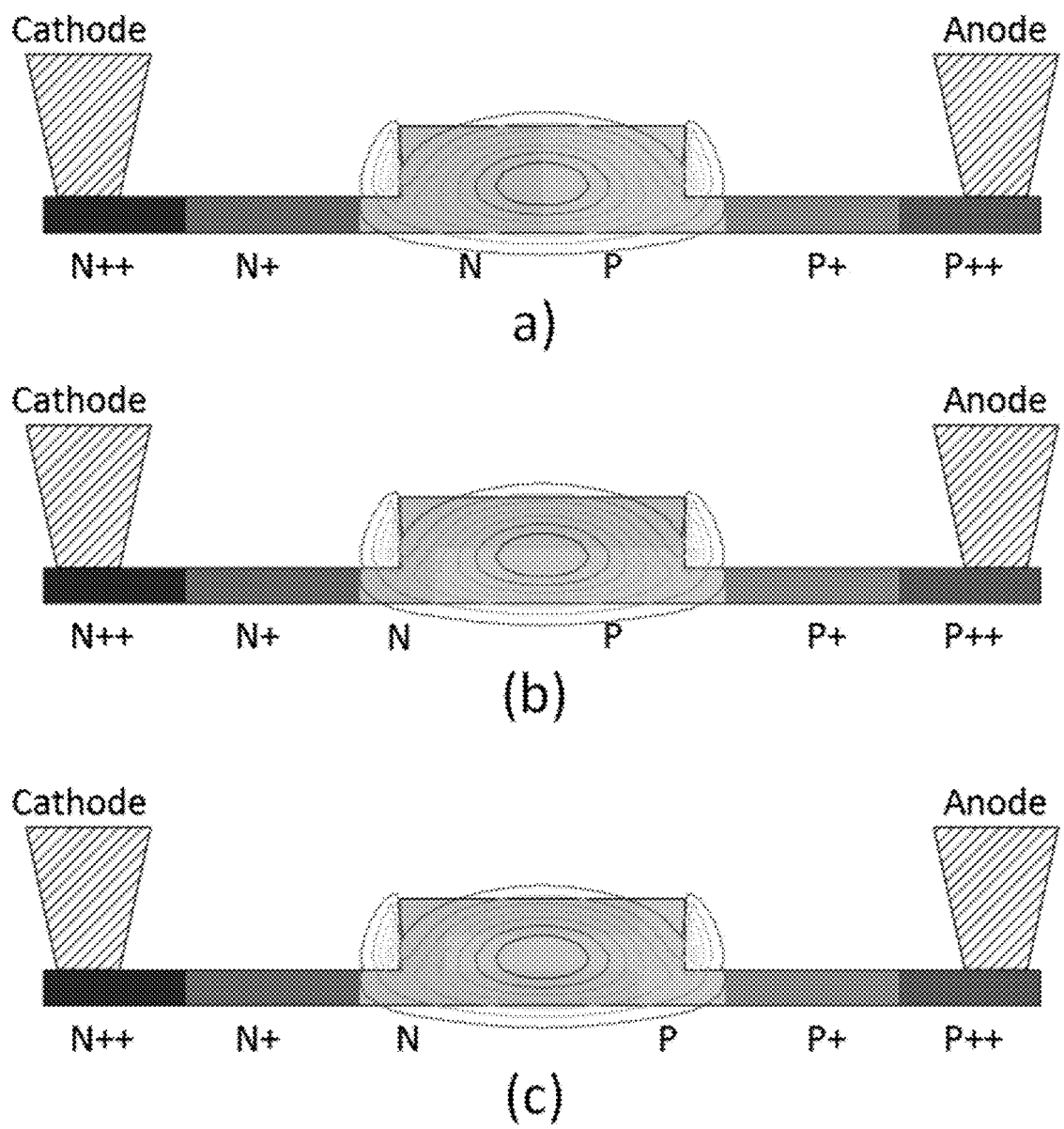
FIG. 1A illustrates a silicon modulator structure for a lateral PN junction in accordance with one or more embodiments.
FIG. 1B illustrates a silicon modulator structure for a vertical PN junction (sometime referred to by L-shaped junction) in accordance with one or more embodiments.
FIG. 1C illustrates a silicon modulator structure for a U-shaped PN junction in accordance with one or more embodiments.

FIG. 1 provides cross-section views of three typical silicon modulators, each with a different PN junction shape. It would be readily appreciated by one skilled in the art that in addition to these three types of PN junctions, there may be other types of PN junctions used in the silicon modulator disclosed herein, without departing from the present disclosure.

Figure 2:
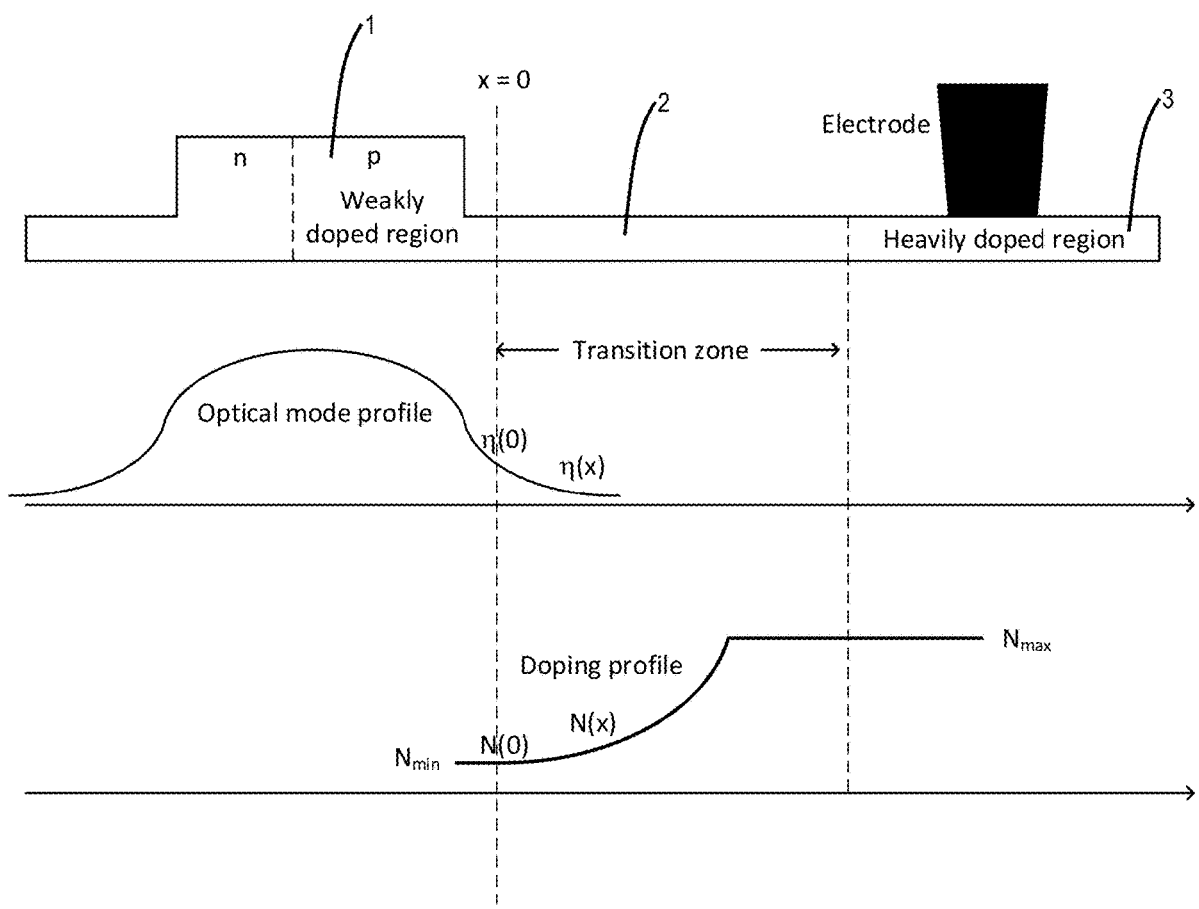
FIG. 2 illustrates a graphical illustration of a silicon waveguide, optical mode profile, and doping profile in accordance with one or more embodiments.

While the doping concentration in each of the transition zones in FIG. 1 is uniform (N+ and P+ respectively), FIG. 2 shows a novel, non-uniform doping profile in the transition zones 2 to achieve optimum trade-off between optical attenuation and contact resistance, wherein x represents the position in the transition zone 2 between the NP junction and each side electrode and N(x) represents the doping level at a given position. For illustration purposes, only the electrode on p-side is shown in FIG. 2.

First, consider the optical attenuation. Let $\eta(x)$ express the lateral optical mode intensity profile. As seen in FIG. 2, in one or more embodiments, because the focus is on the transition zone 2, the origin of this profile is set at the beginning of the transition zone 2 instead of the middle of the waveguide. Although the mode is mainly contained in the waveguide core 1 defined by the thick portion of the ridge waveguide, there may be some light that extends in the slab region. The intensity of light at a given position in the slab region decreases exponentially as the distance from the waveguide core 1 grows.

Accordingly, in the transition zone 2, the mode profile may be approximated as:

$$\eta(x) = \eta(0) e^{-\beta x}. \tag{1}$$

The fraction of the mode energy at position x and over a width dx is given by:

$$d\eta(x) = \frac{\eta(x)dx}{\int_{-\infty}^{\infty}\eta(x)}. \tag{2}$$

The presence of free carriers creates an absorption of light. According to the well-known Soref equations (such as described in R. Soref and B. Bennett, "Electrooptical effects in silicon," IEEE J. Quantum Electron., vol. 23, no. 1, pp. 123-129, 1987, the contents of which are incorporated by reference), there is a linear dependency between the attenuation coefficient and the free carrier concentration. Since the free carrier concentration equals the dopant concentration, one can consider that the attenuation contribution at the position x is directly proportional to the dopant concentration at this location and to the fraction of the mode energy at this same location:

$$d\alpha(x) = A \cdot N(x) \cdot d\eta(x), \quad (3)$$

where A is a constant.

The overall mode energy can be considered as a constant. Thus, the same equation may be written as:

$$d\alpha(x) = dA \cdot N(x) \cdot \eta(x) \quad (3)$$

where dA is another constant.

If the focus is on the contribution of the attenuation only at locations 0 and x, consider that they together provide attenuation of:

$$d\alpha(0,x) = dA \cdot (N(0) \cdot \eta(0) + N(x) \cdot \eta(x)). \quad (4)$$

From that condition, a perturbation may be considered where the doping concentration is slightly changed by an amount $\Delta N_0$ at 0 and $\Delta N_x$ at x. The attenuation contribution becomes:

$$d\alpha(0,x)' = dA \cdot ((N(0) + \Delta N_0) \cdot \eta(0) + (N(x) + \Delta N_x) \cdot \eta(x)). \quad (5)$$

Considering the last two equations, one of ordinary skill in the art would readily appreciate that the attenuation remains unchanged if:

$$\Delta N_0 \cdot \eta(0) + \Delta N_x \cdot \eta(x) = 0, \quad (6)$$

or in other words if:

$$\Delta N_x = -\Delta N_0 \frac{\eta(0)}{\eta(x)}. \quad (7)$$

Now consider the contact resistance. The sheet resistance of a thin layer of doped silicon decreases as the doping concentration increases. It is experimentally found that, within a certain range of interest, the sheet resistance R depends on the doping concentration N as:

$$R = KN^{-\gamma}, \quad (8)$$

where K is a constant and γ found to be about 0.7.

The contact resistance of the modulator is the sum of infinitesimal sheet resistances between the electrode and the waveguide.

Again, focusing only at contributions at 0 and x, an equation may be written as:

$$R_{0,x} = KN(0)^{-\gamma} + KN(x)^{-\gamma}. \quad (9)$$

Now consider the change in the contact resistance resulting from a change in the doping concentration at 0 and x with the amounts already introduced:

$$R_{0,x}' = K(N(0) + \Delta N_0)^{-\gamma} + K(N(x) + \Delta N_x)^{-\gamma}. \quad (10)$$

With $\Delta N_x$ chosen to keep the optical attenuation unchanged, the equation is:

$$R_{0,x}' = K(N(0) + \Delta N_0)^{-\gamma} + K\left(N(x) - \Delta N_0 \frac{\eta(0)}{\eta(x)}\right)^{-\gamma}. \quad (11)$$

For a small value of $\Delta N_0$, the equation becomes:

$$R_{0,x}' \approx KN(0)^{-\gamma} + KN(x)^{-\gamma} + \Delta N_0 K\gamma \left\{ \frac{\eta(0)}{\eta(x)} N(x)^{-\gamma-1} - N(0)^{-\gamma-1} \right\} + \quad (12)$$

$$\Delta N_0^2 \frac{K\gamma(\gamma+1)}{2} \left\{ \left(\frac{\eta(0)}{\eta(2)}\right)^2 N(x)^{-\gamma-2} - N(0)^{-\gamma-2} \right\}.$$

When the term that is linear as $\Delta N_0$ vanishes, that is when:

$$\frac{\eta(0)}{\eta(x)} N(x)^{-\gamma-1} - N(0)^{-\gamma-1} = 0, \quad (13)$$

the contact resistance necessarily increases regardless of the value and the sign of $\Delta N_0$. In other words, in one or more embodiments, the doping profile is optimum when the above equation is met, as being the one that provides the lowest contact resistance.

The doping concentration at position x can be isolated from the equation (13) above, thus providing an expression for the optimum doping profile:

$$N(x) = N(0) \left(\frac{\eta(0)}{\eta(x)}\right)^{\frac{1}{\gamma+1}}. \quad (14)$$

For a modal profile given by equation (1), one has the optimum lateral doping profile given by:

$$N(x) = N(0) e^{\left(\frac{\beta}{\gamma+1}\right)x}. \quad (15)$$

Based on the above and as illustrated in FIG. 2, it may be seen that the doping profile N(z) tends to increase exponentially as a function of the distance from the waveguide core 1. In one or more embodiments, a higher limit may be placed to the doping concentration $N_{max}$, being the one selected for the ohmic contact 3 near the electrode. If such a modification is performed, a profile such as that illustrated at the bottom of FIG. 2 may be achieved.

During fabrication, doping is achieved by bombarding the surface of the silicon with dopant ions. As in many steps of CMOS fabrication, this implantation is done only at certain locations by using a mask. After implantation, the ions are interstitial in the material and does not provide the desired dopant effect of providing or capturing free carriers.

In order to provide the desired dopant effect, the dopants are required to be integrated within the crystalline structure. In one or more embodiments, an annealing process involving an increase of temperature for a short period of time allows the dopant ions to integrate into the crystalline structure and become activated.

The annealing process not only activates the dopants but also allows them to diffuse in their vicinity. This diffusion causes a blurring of the initial dopant distribution both in depth and laterally away from the mask edge.

By choosing an appropriately long time annealing process, it is possible to obtain a dopant profile close to the optimum one illustrated in FIG. 2.

In one or more embodiments, the dopant distribution within the waveguide core 1, that is, the one that forms the PN junction, is required to be as sharp as possible and dopant distribution at this location is required to diffuse as little as possible during the annealing process. To achieve both a smooth profile in the transition zone 2 and a sharp profile in the waveguide core 1, the fabrication method P1 described in FIG. 3 may be performed.

In a first step S1, a first strong implantation is performed in the electrode regions 3.

In a second step S2, a long annealing is performed to both activate and diffuse the ions of the first step implantation.

In a third step S3, a second weak implantation is performed in the waveguide core region 1.

In a fourth step S4, a second short annealing is performed to activate the second weak implantation while keeping its diffusion as low as possible.

Figure 3:
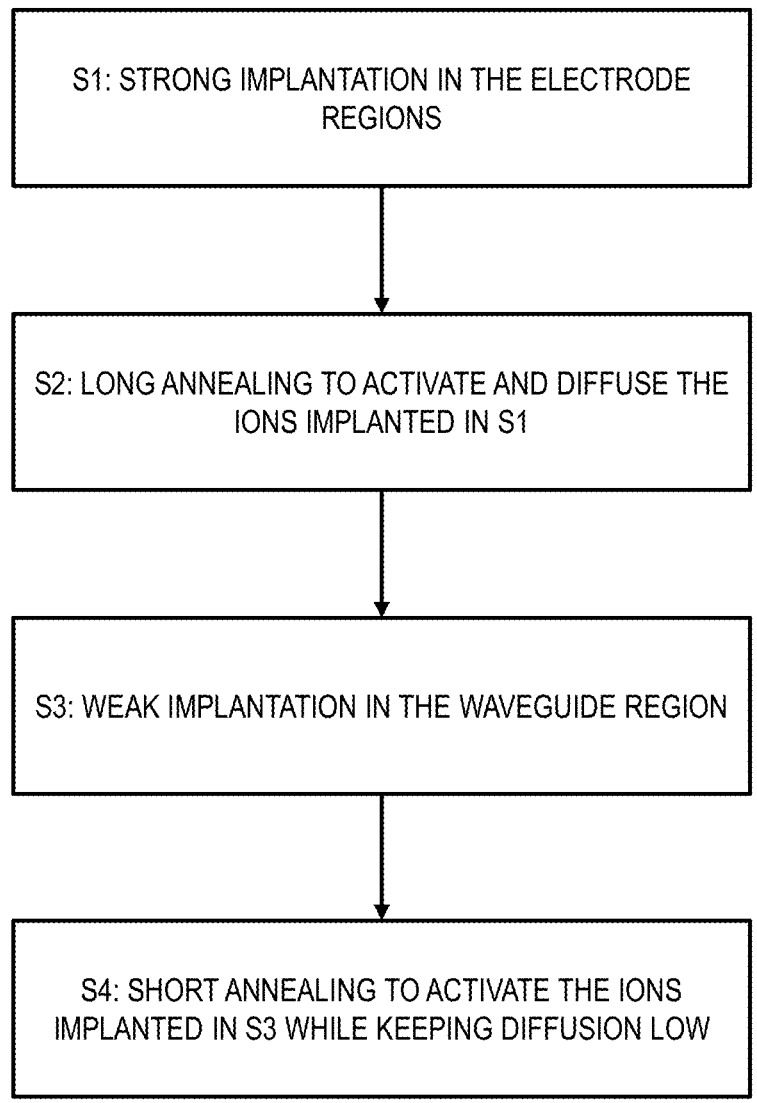
FIG. 3 illustrates a flowchart for a method of fabricating a doping profile of a silicon-based modulator in accordance with one or more embodiments.

In one or more embodiments, the method of FIG. 3 and the equations described above may be used to calculate an optimum lateral doping profile in the transition zones 2 between the waveguide core 1 and the electrodes of the silicon modulator. In addition, embodiments also relate to the fabrication of one or more silicon modulator devices having a doping profile that approaches the calculated optimum profile in accordance with the above description. As described herein, lateral means the direction from the wavelength core 1 to the electrode regions 3. That is, the doping profile in the transition regions 2 is varied from the waveguide core 1 to the electrode regions 3 in a lateral direction, i.e., from right to left or left to right looking at FIG. 1. Conversely, the longitudinal direction would be into the page.

Optimizing the Lateral Doping Profile

Figure 4:
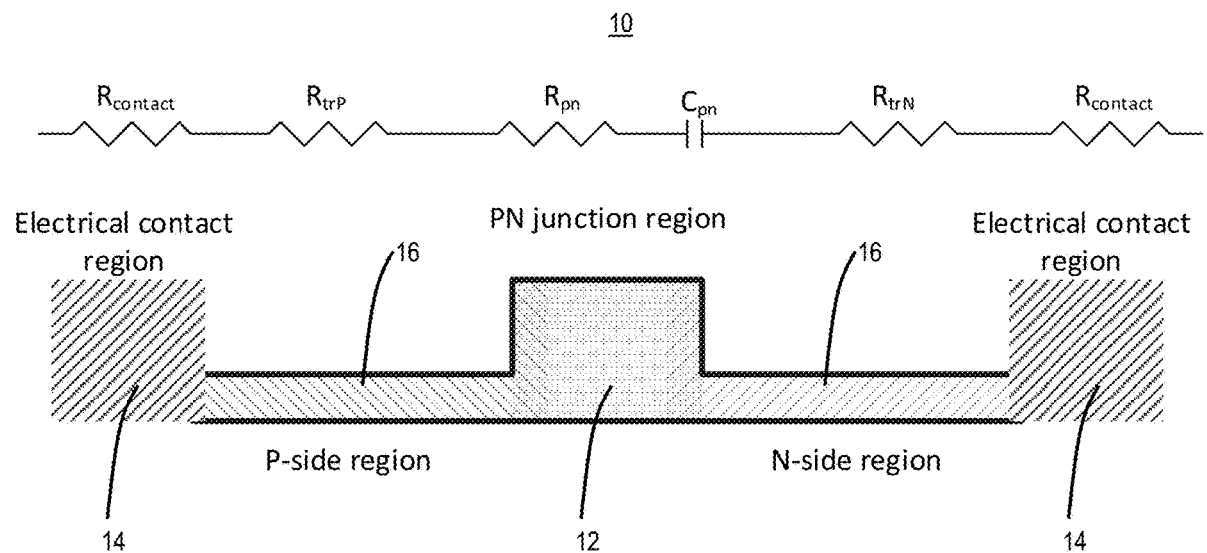
FIG. 4 illustrates an optical modulator with an equivalent circuit illustrating resistance in accordance with one or more embodiments.
Figure 5:
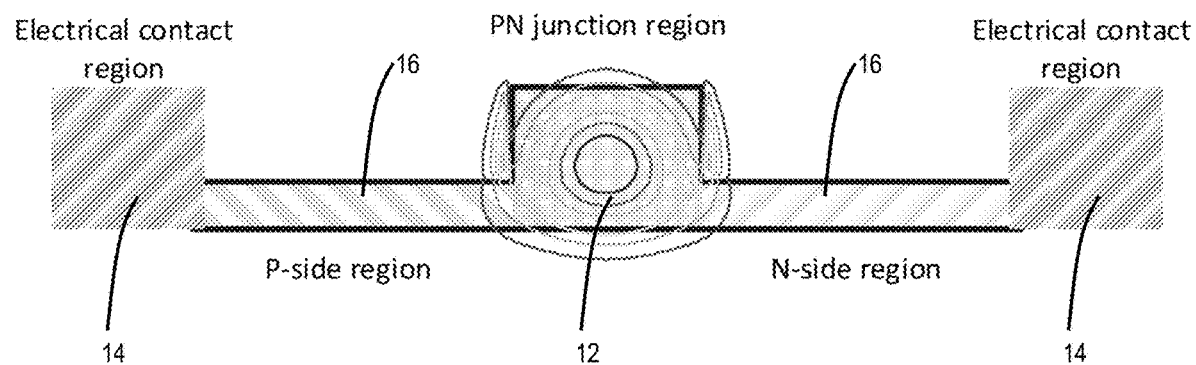
FIG. 5 illustrates the optical modulator illustrating optical losses in accordance with one or more embodiments.

A quantitative evaluation of the optimal doping profile is now described. FIG. 4 illustrates an optical modulator 10 with an equivalent circuit illustrating resistance and FIG. 5 illustrates the optical modulator 10 illustrating optical losses. Again, the optical modulator 10 includes three sections, namely a PN junction region 12, an electrical contact region 14, and a transition region 16. The PN junction region 12 region is where an optical wave accumulates a phase shift due to the PN junction. The electrical contact region 14 is where an electrical signal applied to the optical modulator 10 is transitioning from a doped silicon layer to a metal via. The transition region 16 is between the PN junction region 12 and the electrical contact region 14. The position of the transition region 16 can vary depending on the PN junction geometry. For example, the silicon thickness of the slab in the transition region 16 can be around 90 nm.

In various embodiments, optimization is described for the two transition regions 16. As described herein, an optimized lateral doping profile provides lower optical losses for a given access resistance or vice versa. The electrical circuit of a depletion-based modulator is shown in FIG. 4 where $R_{contact}$ is the contact resistance, $R_{trP}$ and $R_{trN}$ is the resistance associated to the transition regions and $R_{pn}$ an $C_{pn}$ are the resistance and capacitance of the PN junction region. The total resistance of the phase shifter (the PN junction region 12) is given by $2R_{contact}+R_{pn}+R_{trP}+R_{trN}$. However, in the context of optimizing the lateral doping profile, only the contribution of $R_{trP}$ and $R_{trN}$ are considered. The lateral doping profile does not have an impact on the contact resistance nor on the resistance in the PN junction.

As a reference for comparison, resistances were measured in an optical modulator 10 with a conventional doping profile. The resistances were measured experimentally as $R_{contact}$~2.5Ω, $R_{pn}$~12Ω, $R_{trP}$~26Ω, and $R_{trN}$~15Ω for segments that were 150 microns in length. Thus, the lateral doping profile is a significant contributor of the total resistance the PN junction region 12.

Referring to FIG. 5, the optical losses (OL) were simulated and confirmed experimentally and can be decomposed into: 1) Sidewall roughness loss, 2) loss in the PN junction regions, 3) loss on the P side, and 4) loss on the N side. These values in the physical optical modulator 10 are as follows: 1) Sidewall roughness loss ~2 dB/cm—loss of the waveguide without implantation. This loss comes from the overlap of the optical mode width the rough sidewalls of the waveguide. 2) The loss in the PN junction region (biased at the typical operating point of 2 V) ~3.8 dB/cm (the largest portion of the mode intensity). 3) Loss on the P side ~0.8 dB/cm. 4) Loss on the N side ~1.1 dB/cm. A large portion of the optical losses is from the dopants in the PN junction region 12. However, the propagation loss in the access regions is not negligible.

Figure 6:
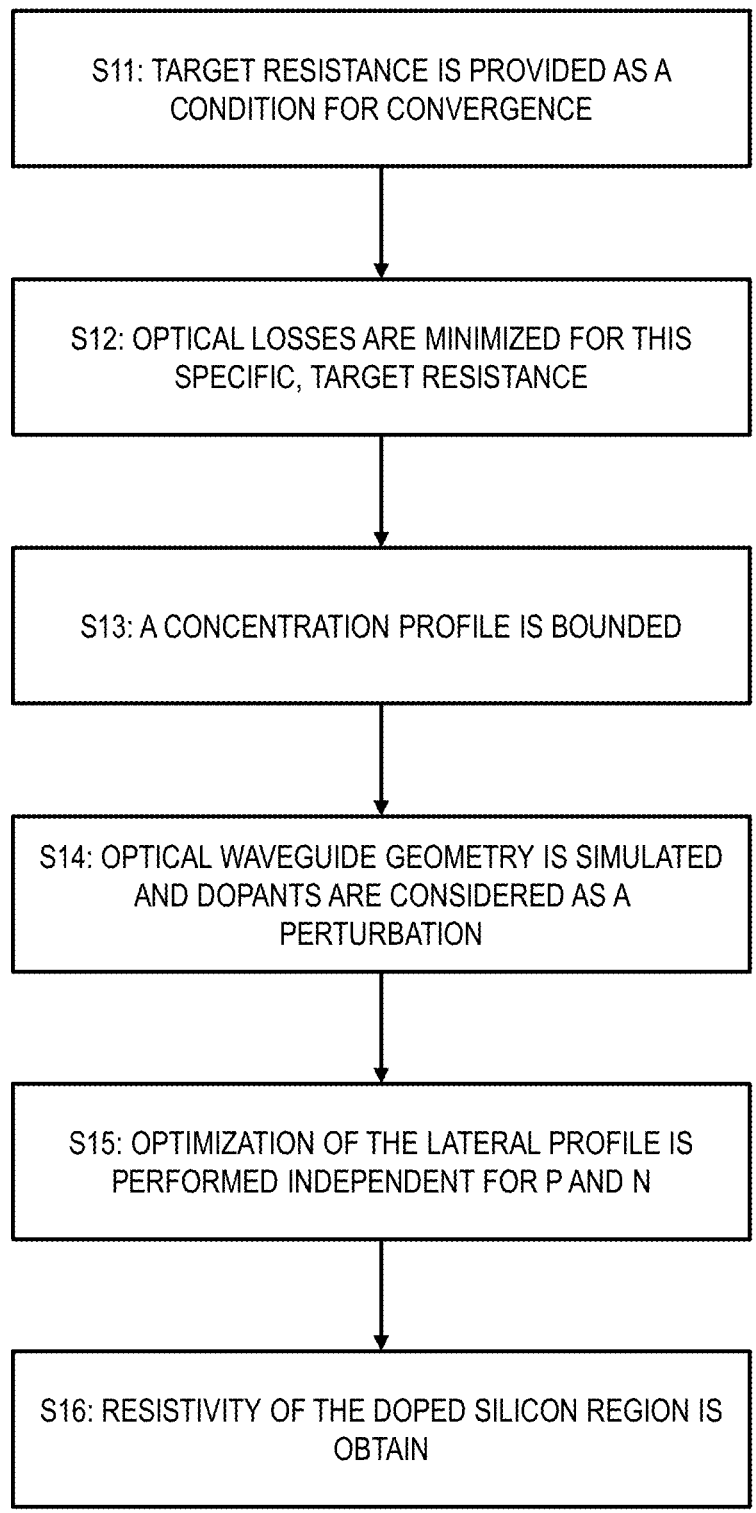
FIG. 6 illustrates a flowchart of an optimization process for the lateral doping profile in accordance with one or more embodiments.

FIG. 6 is a flowchart of an optimization process P2 for the lateral doping profile. In a first step S11, a target resistance is provided as a condition for the convergence.

In a second step S12, the optimization process minimizes the optical losses for this specific resistance value.

In a third step S13, the concentration profile is bounded. A maximal doping concentration is defined (corresponding to the doping concentration required at the electrical contact region). A minimal doping concentration is also defined (this value is not necessarily determined by the PN junction region doping concentration, but this value is swept).

In a fourth step S14, the optical mode of the various optical waveguide geometries is simulated, such as in a Lumerical Mode solution, and the dopants are considered as a perturbation. As a result, the simulated structures do not contain dopants. The optical losses are calculated afterward using the overlap of the unperturbed mode on the doped areas. The complex effective index of the doped regions is obtained using Soref equations. The vertical doping profile is considered uniform.

In a fifth step S15, the optimization of the lateral profile is performed independently for P and for N.

Figure 7:
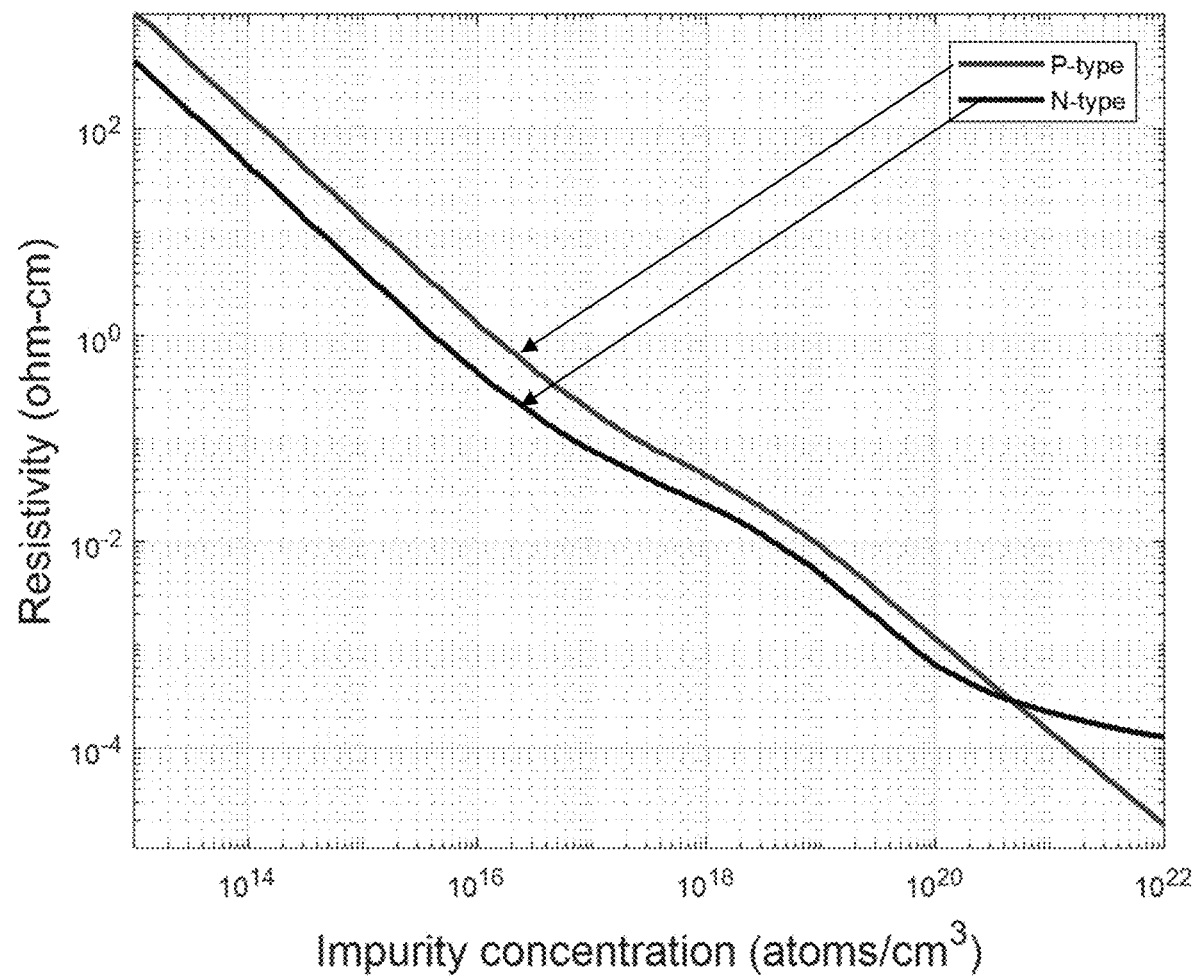
FIG. 7 is a graph of resistivity versus impurity concentration for P and N-type dopants in accordance with one or more embodiments.

In a sixth step S16, the resistivity of the doped silicon region is obtained using the well-known empirical results, e.g., FIG. 7 is a graph of resistivity versus impurity concentration for P and N-type dopants.

As mentioned herein, an optimal lateral profile is calculated using a target resistance value (the OL is minimized). Once the profile is found, the optimal OL is calculated for this specific resistance value. To evaluate the impact of optimizing lateral profiles, a series of profiles were calculated with various target resistance values (from 5 to 30Ω).

Figure 8A:
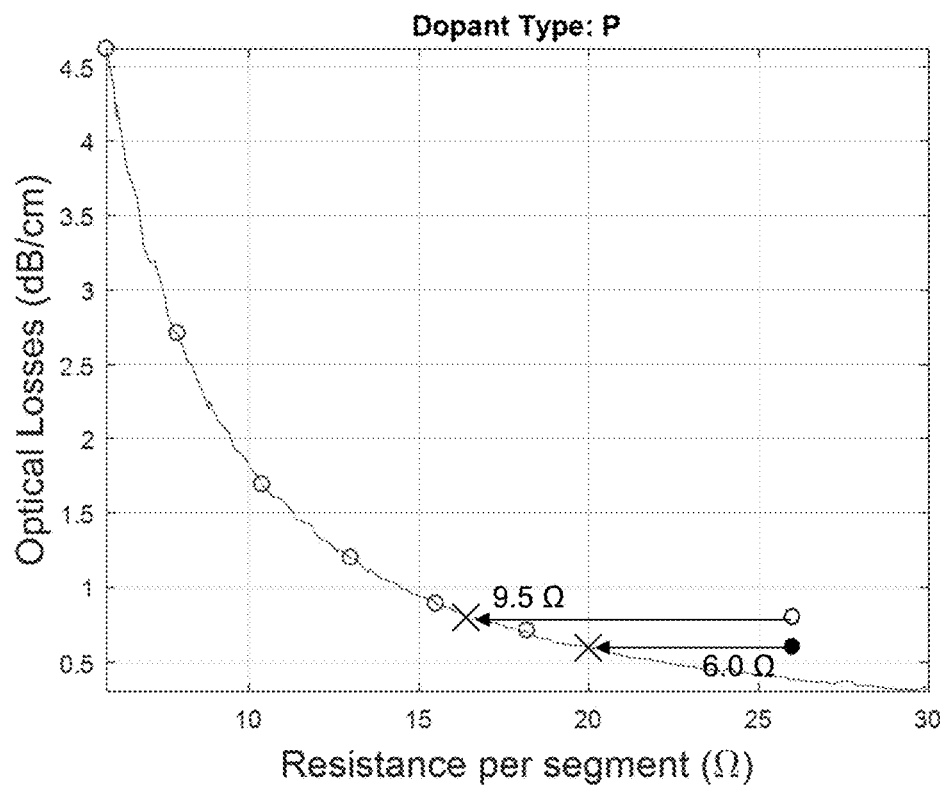
FIGS. 8A and 8B illustrate resistance per segment as a function of optical losses, for P and N-type dopants in accordance with one or more embodiments.
Figure 8B:
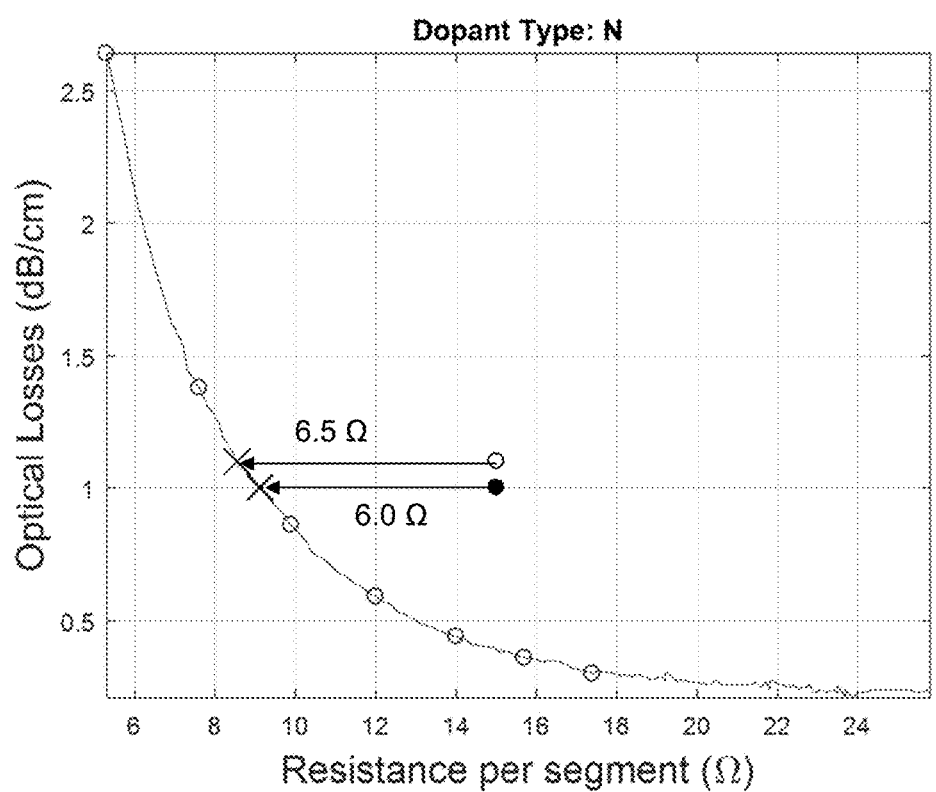

FIGS. 8A and 8B illustrate resistance per segment as a function of optical losses, for P and N-type dopants. The open dots represent experimental data of actual modulators while the black dots are the simulated results for the same modulator. The difference between the black and open dots can be associated with an error in the fabrication process or an error in the experimental characterization of the OL/R parameters. However, the close proximity of these two points does not modify the main conclusion. The "x" markers correspond to a modulator using the optimal doping profile and having the same OL as the experimental modulator.

Figure 9:
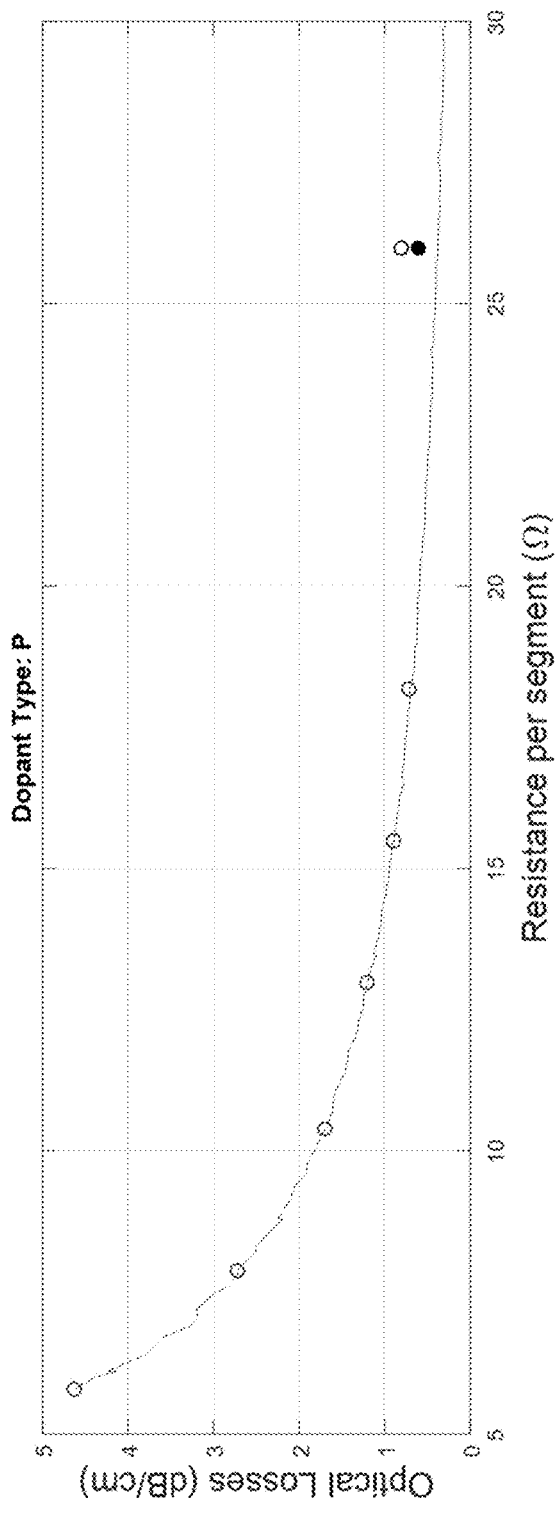
FIG. 9 illustrates graphs of resistance per segment as a function of optical losses and doping in accordance with one or more embodiments.
Figure 9:
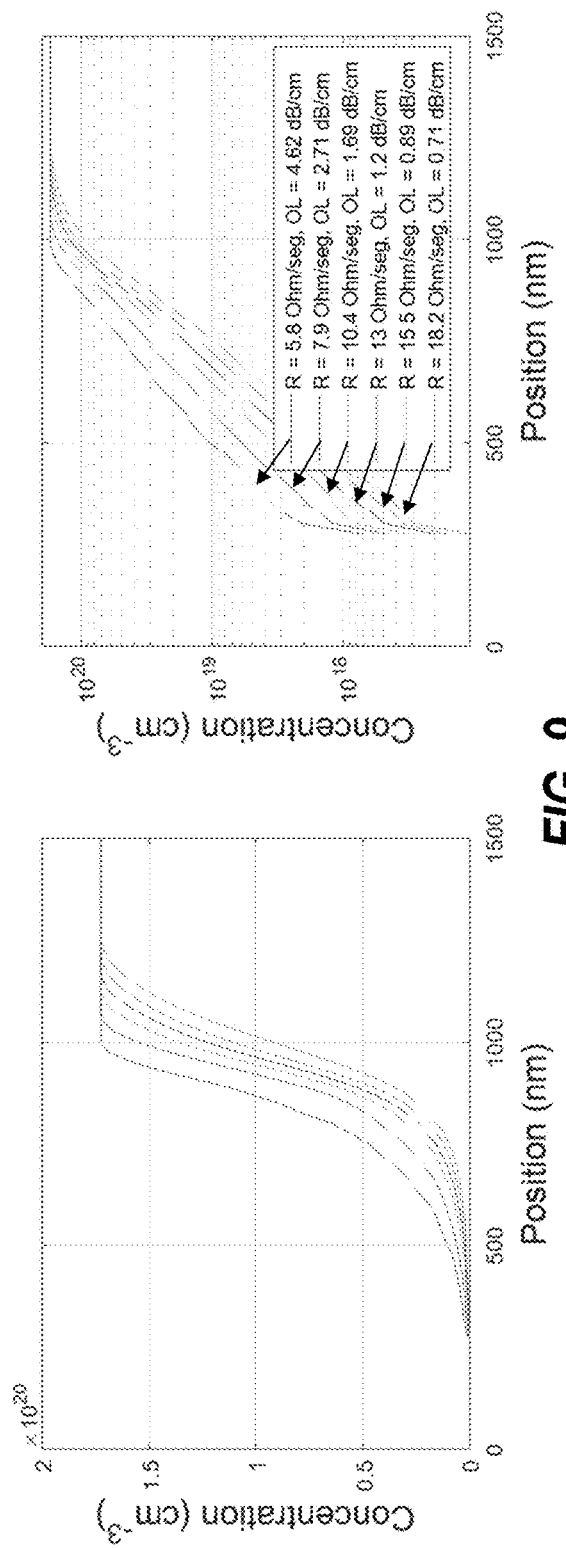

The top figure of FIG. 9 is the same curve as shown in FIG. 8A (for P only). The bottom figures of FIG. 9 are the optimized lateral profiles (linear (left graph) and log scale (right graph)) for various values of access resistance (indicated by the markers in the top figure). As discussed herein, the optimal profiles indeed follow an exponential shape.

The potential gain for this technique is between 12-16Ω for a single PN junction.

In an embodiment, modulators can be series push-pull (SPP) which include two diodes back to back. As a result, the total capacitance of the circuit is halved, and the resistance is twice the one shown previously. Thus, the improvement is doubled.

The improvement of 12-16Ω for one PN junction or 24-32Ω for an SPP modulator results in a bandwidth improvement of about 4-5 GHz (such improvement was simulated based on the experimental data provided herein for the experimental modulator).

Thus, the benefit of this approach is significant since it increases the bandwidth without degrading any other parameters. Furthermore, the non-optimal lateral profiles conventionally used are more likely to produce an imbalance in the loss of the Mach-Zehnder modulator (MZM) arms because of potential mask misalignment, and thus degradation of the Extinction Ratio (ER) of the Mach-Zehnder Interferometer (MZI).

Longitudinal Profile

While the doping profile according to the equation (15) is achievable through the aforementioned fabrication method, one or more embodiments discussed herein relate to mimicking such a lateral doping profile in the aggregate, in which the doping concentration gradually changes along the longitudinal direction, using configurations of uniformly-doped areas with different shapes. Indeed, the attenuation of the light propagating through the waveguide is the sum of the attenuation experienced through the many longitudinal sections. The overall attenuation is then equivalent to the longitudinal average of the lateral doping profile. In the same manner, the contact resistance depends on the full geometric dopant profile.

The following discussion provides examples in which such a lateral doping profile may be achieved, via changes along the longitudinal direction, using configurations of uniformly-doped areas with different shapes. The following discussion focuses on the configuration of the transition zone 2, which exists between the region 1 where the optical mode is confined and each electrode. In the transition zone 2, the optical mode is exponentially decaying. The transition zone 2 has a dominating influence on the performance of optical modulators. High doping concentrations will result in modulators with high optical losses but with good modulation bandwidth, whereas low doping concentration will produce modulators with low optical losses but with reduced bandwidth.

In one or more embodiments, in a first example, instead of uniformly doping a slab-shaped transition zone 2, e.g., a slab-shaped p-type transition zone, at concentration level p+ whereas p<p+<p++, p being the concentration level of the P region 1 on the P side of the PN junction and p++ being the concentration level at the P++ region 3 contacted by the anode, one may divide such p-type transition zone 2 into k (k≥2) divisions $P_1, P_2, \ldots P_k$ arranged in order along the longitudinal direction, each division uniformly doped at a concentration level $p_1, p_2, \ldots p_k$, respectively, such that p≤$p_1$<$p_2$ . . . <$p_k$≤p++, wherein the weakest doped division $P_1$ is adjacent to the P region 1 and the most heavily doped division $P_k$ is adjacent to the P++ region 3 and wherein the boundary between two adjacent divisions meanders along the direction of wave propagation. Also, the same holds for the n transition region, using n, n+, n++, $N_1$, $N_2$, etc. Further, an arbitrary longitudinal doping profile effect may be achieved using regions of uniform doping. In addition to the lateral doping profile optimization, the present disclosure includes providing, on each side of the optical modulator 10, a transition zone 2 having two regions of uniform doping concentration, but non-uniform width as a function of the longitudinal position.

Figure 10:
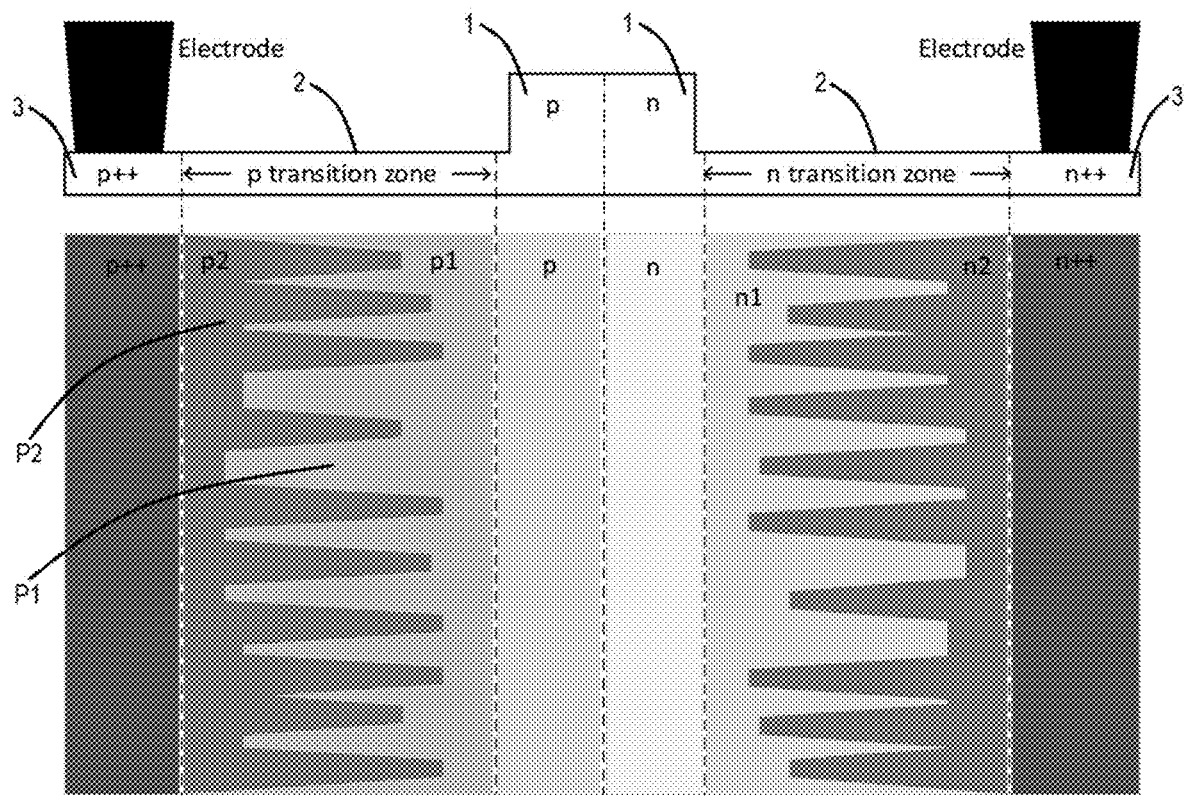
FIG. 10 illustrates a cross-sectional view and a top view of a silicon-based modulator doping profile in accordance with one or more embodiments.

An example of such a doping profile is shown in FIG. 10 in accordance with one or more embodiments disclosed herein. Specifically, FIG. 10 illustrates an example scenario of dividing the transition zone 2 into 2 divisions (k=2) and shows a transition zone 2 that includes an aperiodic pattern. As seen in FIG. 10, the transition zones 2 include two doping concentrations p1 and p2 on the p side, and two doping concentrations n1 and n2 on the n side.

Again, the aim of the transition zone 2 is to provide a trade-off between low optical loss and low access resistance. The doping concentration in this region is required to be as high as possible in order to provide a low access resistance which is needed to achieve a high modulation bandwidth. However, it is also required to be as low as possible to provide a low optical loss. The optical mode is mainly contained within the waveguide core (the thick portion of the ridge waveguide) but also extends in the slab region, typically in the form of exponential decay.

For an optimum trade-off, the doping concentration in the transition zone is required to continuously increase in a specific way from the waveguide to the electrode region, as described herein. However, providing specific spatially-dependent doping concentration is not easy to obtain in practice due to the typical fabrication lithography involving illuminating through a mask. Such a binary method is rather more suited for the fabrication of uniformly doped sections.

The longitudinal dependence of the doping width allows mimicking a lateral doping profile. Indeed, the attenuation of the light propagating through the waveguide is the sum of the attenuation experienced through the many longitudinal sections. The overall attenuation is then equivalent to the longitudinal average of the lateral doping profile. In the same manner, the access resistance depends on the full geometric dopant profile.

Figure 11:
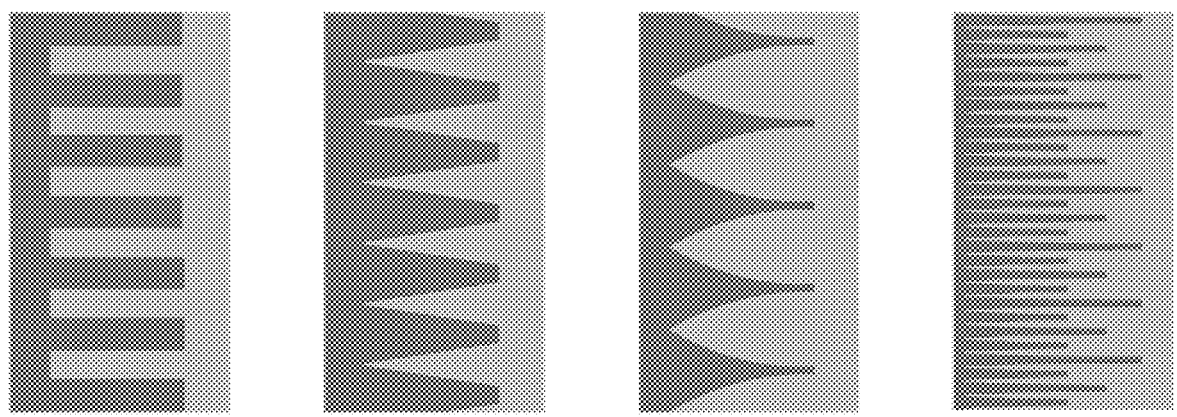
FIGS. 11A-11D illustrate top-view examples of longitudinally varying the transition zones of FIG. 10 in accordance with one or more embodiments.

FIGS. 11A-11D further provide four variations of possible meandering boundaries between $P_1$ and $P_2$ for two divisions (k=2). As can be seen in FIGS. 11A-11D, each of the longitudinally varying transition zones has a different geometry/shape. Specifically, FIG. 11A shows a transition zone that mimics three doping levels but is based on the use of only two levels. FIG. 11B shows a transition zone that includes a linear transition between the two doping levels. FIG. 11C shows a transition zone that includes a non-linear transition between the two doping levels. FIG. 11D shows a transition zone that includes a non-linear transition between the two doping levels using an interleaving strategy to minimize local non-uniformities and/or large pattern period.

Nevertheless, it would be readily appreciated by one skilled in the art that FIGS. 11A-11D is not an exhaustive list of possible boundary patterns. Other possible patterns may include zigzag, sinusoidal, or the combination thereof, and may be aperiodic along the direction of wave propagation. It would also be readily appreciated by one skilled in the art that the shapes of the divisions may be different, and the sizes of these divisions may not necessarily be the same.

In one or more embodiments, the longitudinally varying transition zone 2 may include one or more of the following characteristics:

The longitudinally varying doping profile may be periodic or aperiodic;

The doping concentrations $p_1$ and p may be equal;

The doping concentrations $p_2$ and p++ may be equal;

The doping concentrations $n_1$ and n may be equal;

The doping concentrations $n_2$ and n++ may be equal; and

The longitudinally varying doping profile may be chosen such that its longitudinal average agrees with the optimum lateral doping profile described herein.

In one or more embodiments, an annealing process may be advantageously used after implantation of the longitudinally varying doping in order to blur the spatial distribution and tend to a smooth spatially-varying profile.

The longitudinally varying doping profile in the transition zones 2 may be such that the electric field within the PN junction contains virtually no longitudinal variation. The P and N regions 1 in the waveguide would thus act as a damping zone sufficient to provide a longitudinally uniform depletion of the PN junction.

The first example described above allows for fabricating silicon modulators with improved performance. Due to the flexibility provided in the fabrication, embodiments described in the first example allow a lateral profile that optimizes the trade-off between optical loss and contact resistance to be easily obtained. More specifically, for a given acceptable optical loss, a modulator having a lower contact resistance may be obtained, which translates into a higher bandwidth device.

Reproducing a Custom Lateral Profile with a Longitudinal Profile

Again, a custom lateral implantation profile could be implemented using a longitudinal variation of the dopant. Typically, the doped regions of an optical modulator are fabricated by patterning a photoresist layer using a photolithographic mask and doing the implantation with ions of specific energy, dose, and angle, followed by rapid thermal reflow. This leads to the integration of impurities into the silicon lattice with concentrations (in principle) uniformly distributed along the XZ axis (where the photoresist was removed) while avoiding such impurities where the silicon was protected by the photoresist. The implantation profile along the Y direction depends on the implantation recipe and is assumed to have a uniform doping concentration. The repetition of such process (with various implantation recipes and different masks) will typically create stepwise implantation profile.

Figure 12:
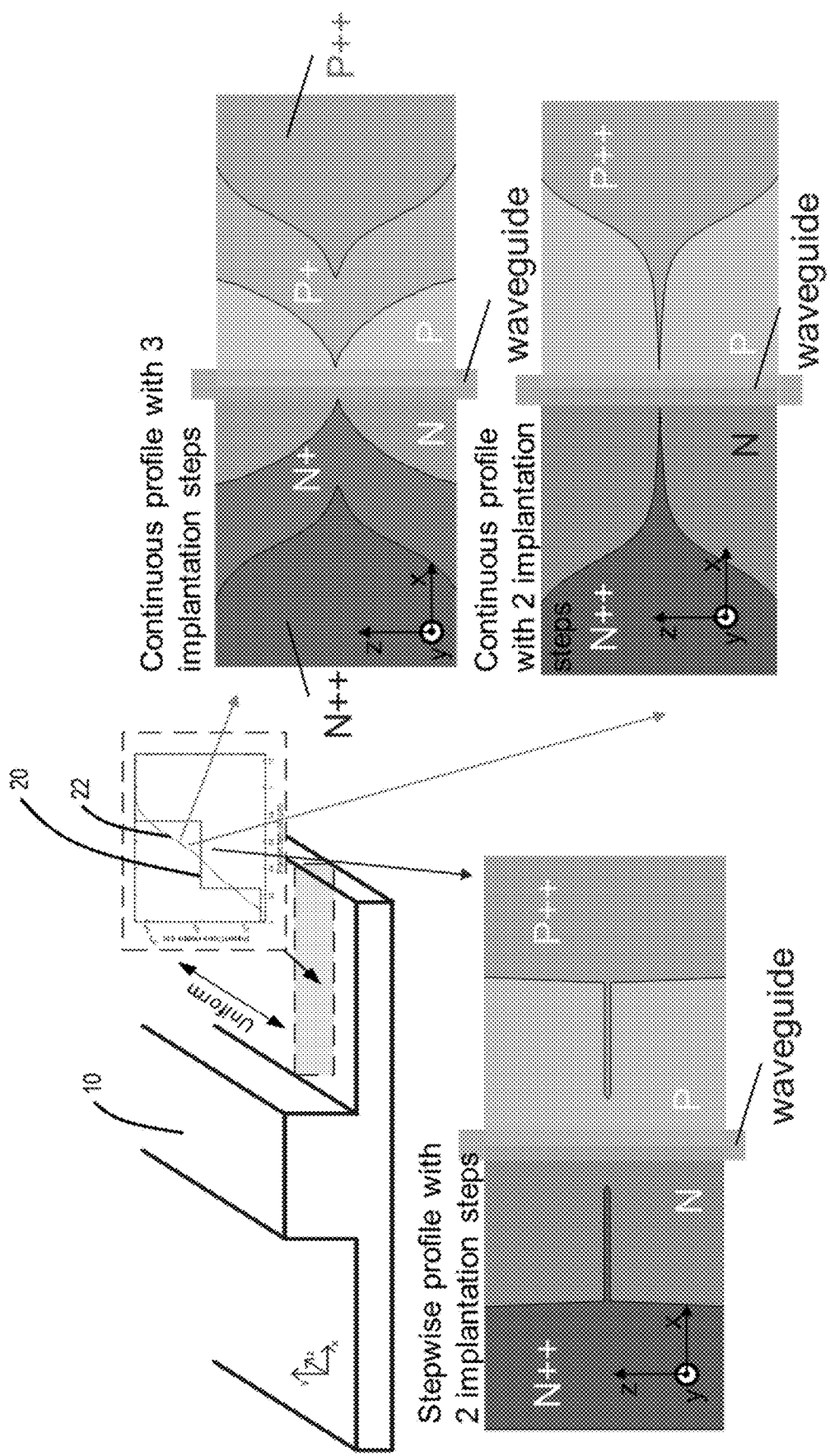
FIG. 12 illustrates an optical modulator 10 various longitudinally varying doping profiles (Z-axis) in accordance with one or more embodiments.

FIG. 12 illustrates an optical modulator 10 with various longitudinally varying doping profiles (Z-axis). In an embodiment, any lateral doping profile (X-axis) (also referred to as input profiles) (e.g., stepwise (line 20) or continuous (line 22)) can be effectively achieved using longitudinally varying profiles (Z-axis) (also referred to herein as output profiles, as our optimization works to determine the appropriate output profile based on the desired input profile). The allows fabrication of elaborate dopant profiles with fewer implantation steps (the masks are shown in shading) and without custom annealing time. These input profiles are uniform in the optical propagation direction (Z-axis) and in the vertical axis (Y-axis) (top-left figure) while the output profiles are varying in the Z-direction.

Figure 13A:
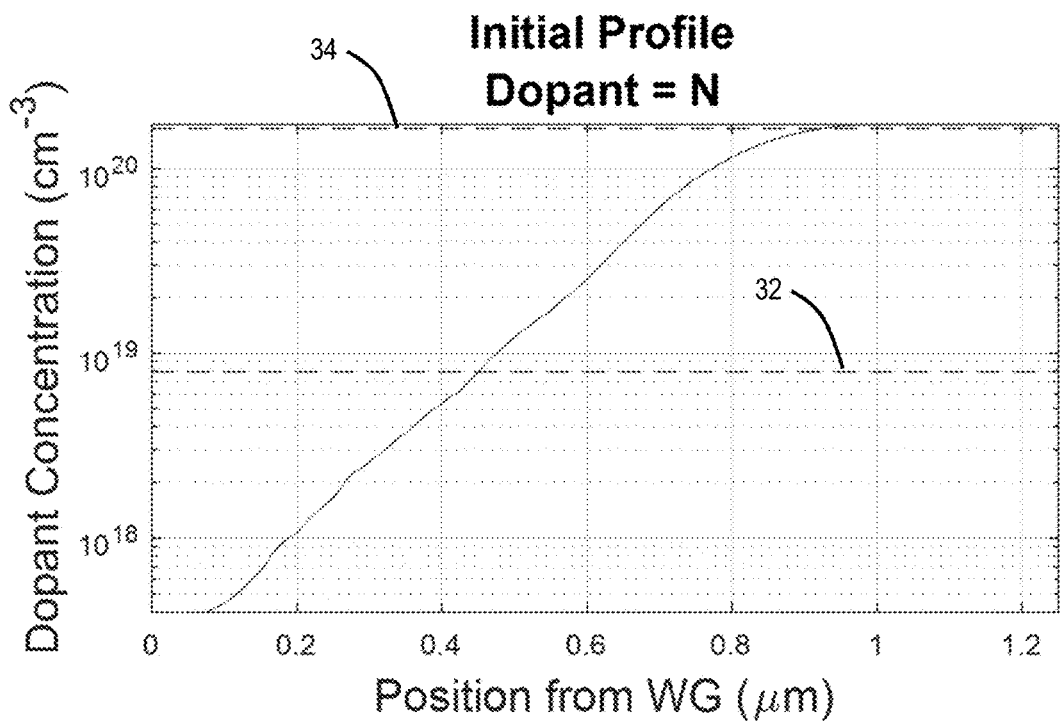
FIGS. 13A and 13B illustrate a graph of an initial N dopant profile and a top view of an optical modulator associated therewith in accordance with one or more embodiments.
Figure 13B:
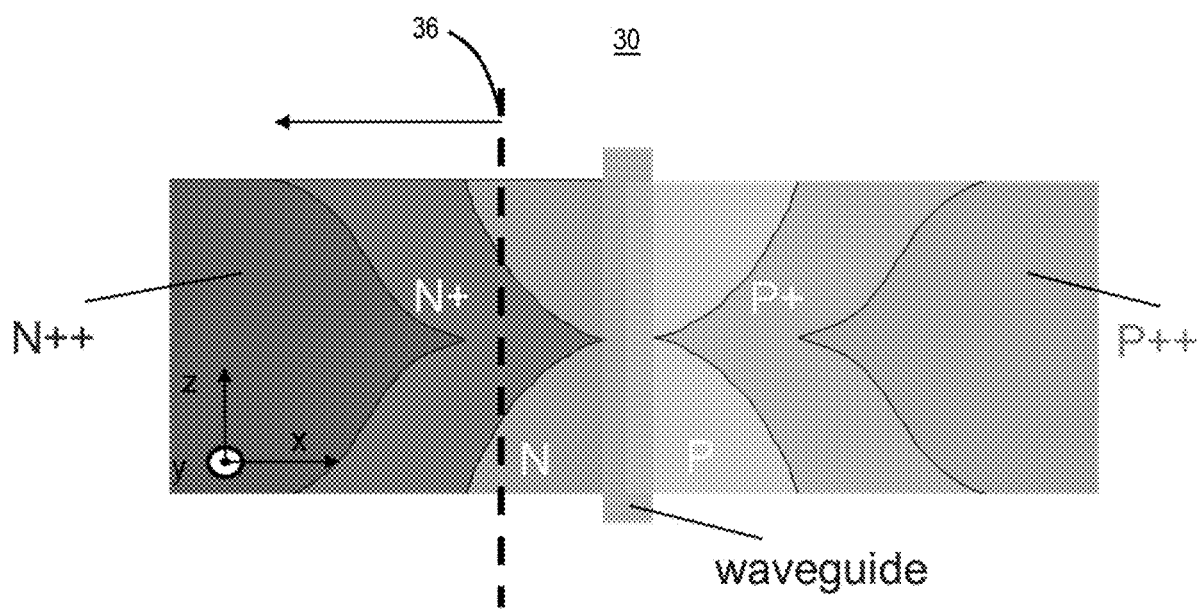

The three main figure of merits (FOM) of optical modulators are 1) Optical losses, 2) Vπ, and 3) Electrical/Optical (EO) bandwidth. To validate the relevance of the embodiments described herein, it is necessary to properly characterize its impact on the modulator FOMs. FIGS. 13A and 13B illustrate a graph of an initial N dopant profile and a top view of an optical modulator 30 associated therewith.

When the lateral profile (i.e., the input profile) is converted into a longitudinal profile (i.e., the output profile), it is desired that the optical losses of both the input and the output profiles remain the same. To ensure that this will be true, the following process includes:

1. The input profile is defined (e.g., graph in FIG. 13A). This profile can be based on the optimizations described herein for lateral profiles.

2. The number of implantation steps (and their dopant concentrations) is defined (three implantation steps are presented in this example) (dotted lines 32, 34 in FIG. 13A are given for dotted line 36 in FIG. 13B on the N side of the waveguide).

3. At each position along the X-axis (dotted line 36 in FIG. 13B), the output profile dopant in the Z-direction is determined such that its average is equal to the dopant concentration of the input profile at the same X-position (black circle). Since the propagation losses (dB/cm) associated to dopant implantation is linearly proportional to the concentration density, the losses in both profiles will thus be equal.

Figure 14A:
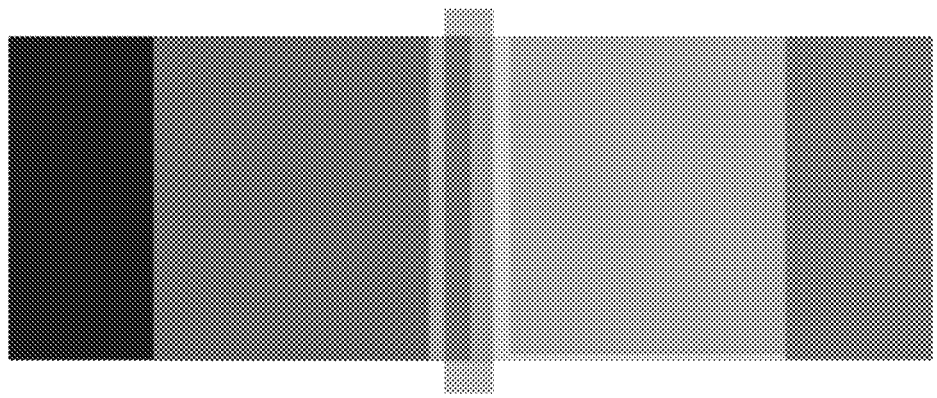
FIGS. 14A, 14B, and 14C illustrate diagrams of various longitudinally varying profiles in accordance with one or more embodiments.
Figure 14B:
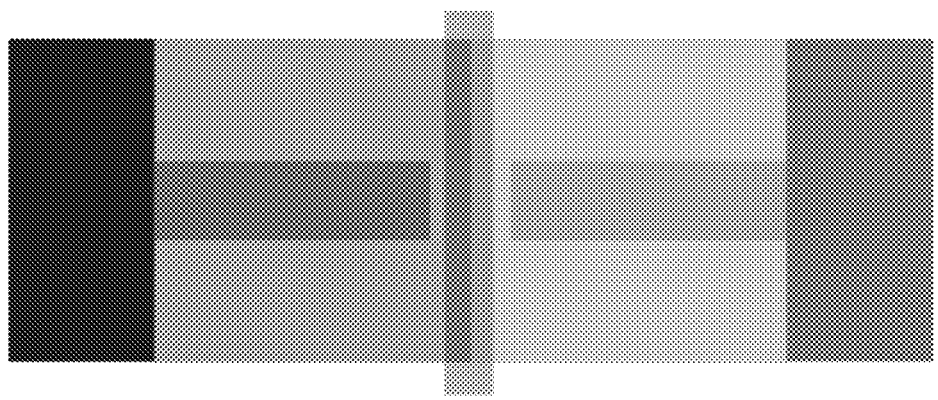
Figure 14C:
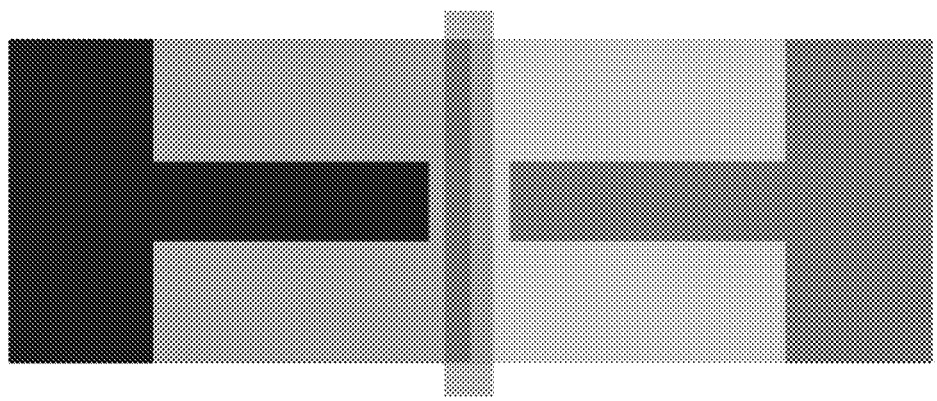

FIGS. 14A, 14B, and 14C are diagrams of various longitudinally varying profiles. In principle, the $V_\pi$ should not be influenced by the access resistance because, in a PN junction operated with a reverse bias, there is no current flowing. As a result, any point on a given side of the PN junction (on the X and Z-axis) is at the same potential. To confirm this statement, DC simulations as a function of voltage were made for the PN junctions shown in FIGS. 14A, 14B, and 14C. One PN junction is uniform (FIG. 14A), the second has a moderately doped teeth (FIG. 14B), and the third one has heavily doped teeth (FIG. 14C).

Figure 15:
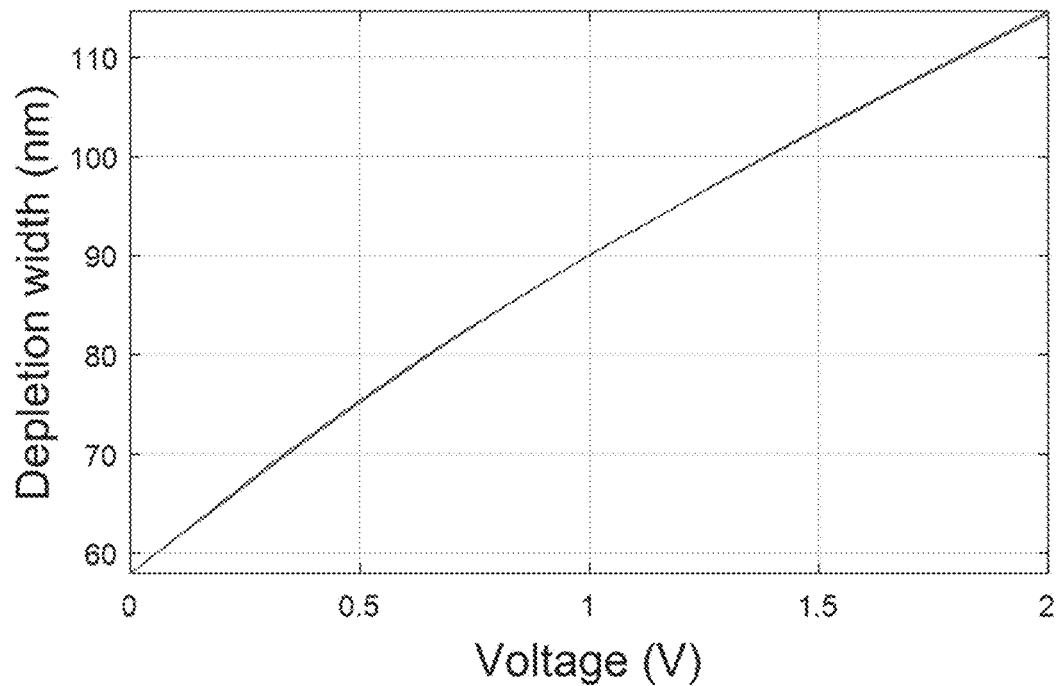
FIG. 15 illustrates a graph of depletion width as a function of voltage for the three embodiments of FIGS. 14A, 14B, and 14C.

The depletion width as a function of voltage for the three simulations is shown in the graph of FIG. 15. The three curves for the embodiments of FIGS. 14A, 14B, and 14C actually superimpose each other in the graph of FIG. 15, showing that the access resistance does not influence the modulator DC $V_\pi$.

To evaluate how the longitudinal profile affects the bandwidth of a modulator, consider the EO response of an optical modulator, which is given by [16] which was taken from G. L. Li, T. G. B. Mason, and P. K. L. Yu, "Analysis of Segmented Traveling-Wave Optical Modulators," *J. Lightwave Technol., JLT*, vol. 22, no. 7, p. 1789, July 2004, the contents of which are incorporated by reference herein:

$$EO(f) = \left| \frac{2}{NV_s} \sum_{n=1}^{N} |V_n| e^{\Delta \phi} \frac{1}{1 - i\omega RC} \right|^2. \quad (16)$$

Aside of the term $2/NV_s$, which is only a normalization constant, the EO response of an optical modulator is decomposed into three terms.

Figure 16:
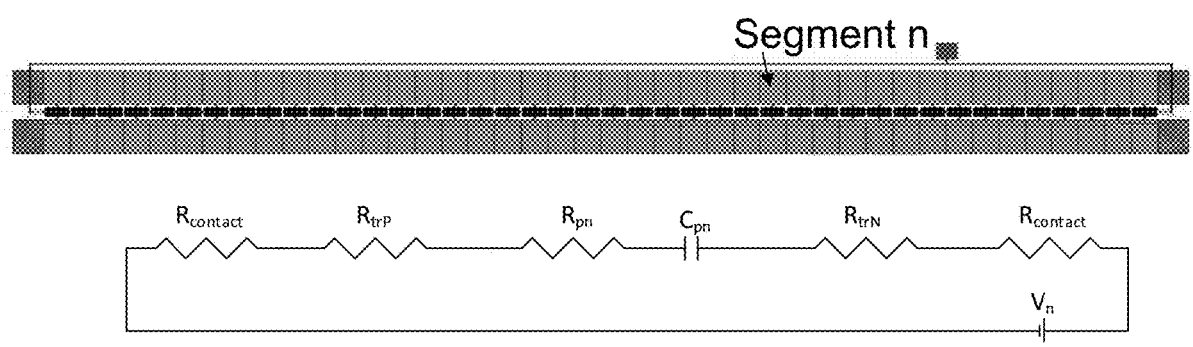
FIG. 16 illustrates a top view of an optical modulator and an equivalent circuit in accordance with one or more embodiments.

1) the term $V_n$ is the voltage appearing at the segment n (see FIG. 16 which is a top view of an optical modulator is and an equivalent circuit). The curve $V_n$ vs. segment number (or versus position along the modulator) represents the Radio Frequency (RF) losses accumulated in the modulator (which is the dominant term in the EO response of a SiP modulator). If the averaged resistance of segment N−1 remains the same, the voltage at the next segment ($V_n$) will not change.

2) $e^{\Delta \phi}$ is a phase term that takes into account the velocity mismatch between the RF and the optical wave. For a PN junction having a relatively low capacitance, the resistance of the junction does not have a significant impact on the RF velocity. Thus, this term will not change with a reduction/ increase of the access resistance. Furthermore, in the event that the resistance has an impact on the RF velocity, the RF waveguide design could be slightly modified to compensate for this effect. Finally, in the case where the access resistance of the output profile is the same as the input profile one, this term will be exactly the same. To conclude, this term does not play a role.

Figure 17:
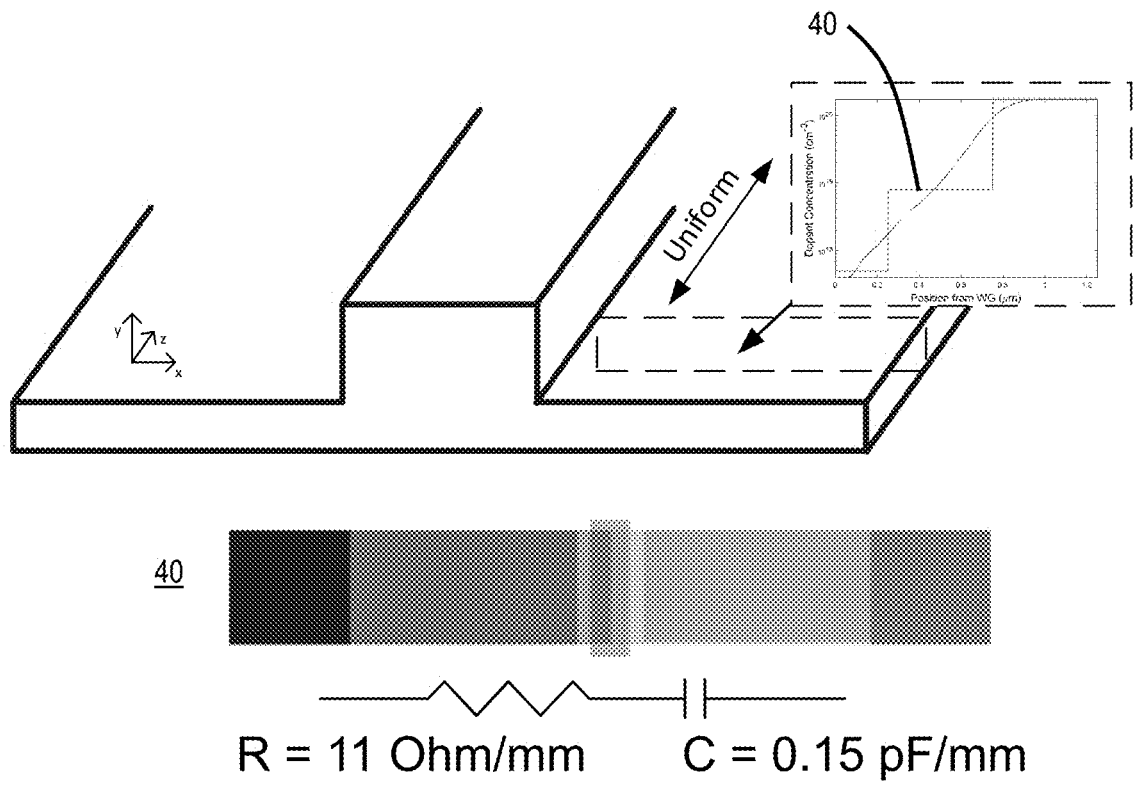
FIG. 17 illustrates an example embodiment with a stepwise profile as the input profile and an output profile with two implantation steps in accordance with one or more embodiments.

3) The third term $$\left(\frac{1}{1-i\omega RC}\right)$$

comes from the Resistor-Capacitor RC response of the PN junction of one segment. To illustrate the impact of having a longitudinal variation of the doping profile, FIG. 17 illustrates an example embodiment with a stepwise profile as the input profile 40 and an output profile with two implantation steps. Typical resistance and capacitance value are shown in FIG. 17. Typical PN junctions have an RC cut off frequency of this junction is thus close to 100 GHz. The baseline PN junctions without intermediate dopant have a resistance of about 13.5 Ω/mm. The bandwidth is thus close to 80 GHz.

Figure 18:
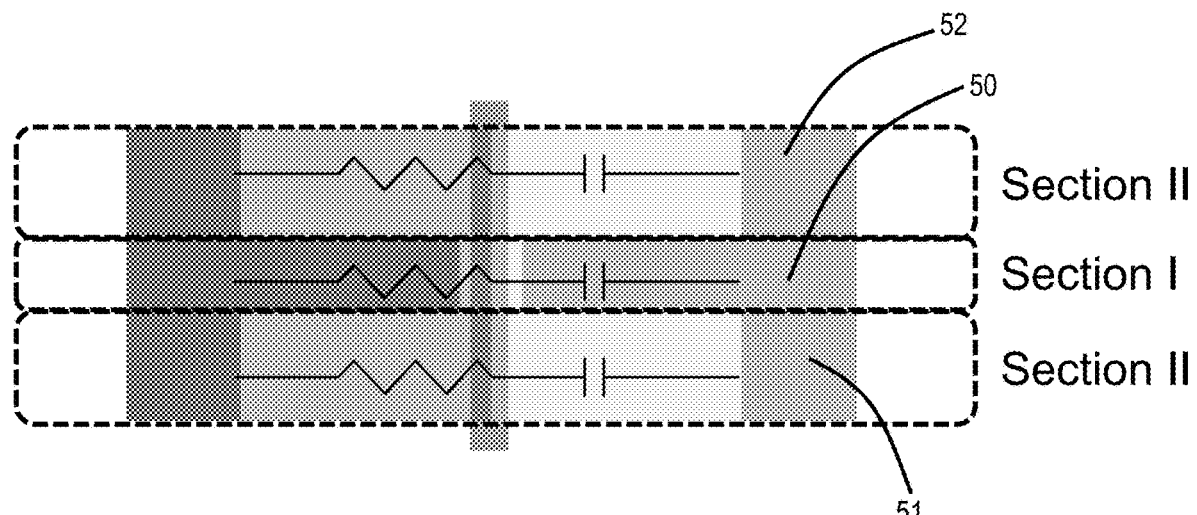
FIG. 18 illustrates a diagram of the output profile from the input profile of FIG. 17 in accordance with one or more embodiments.
Figure 19:
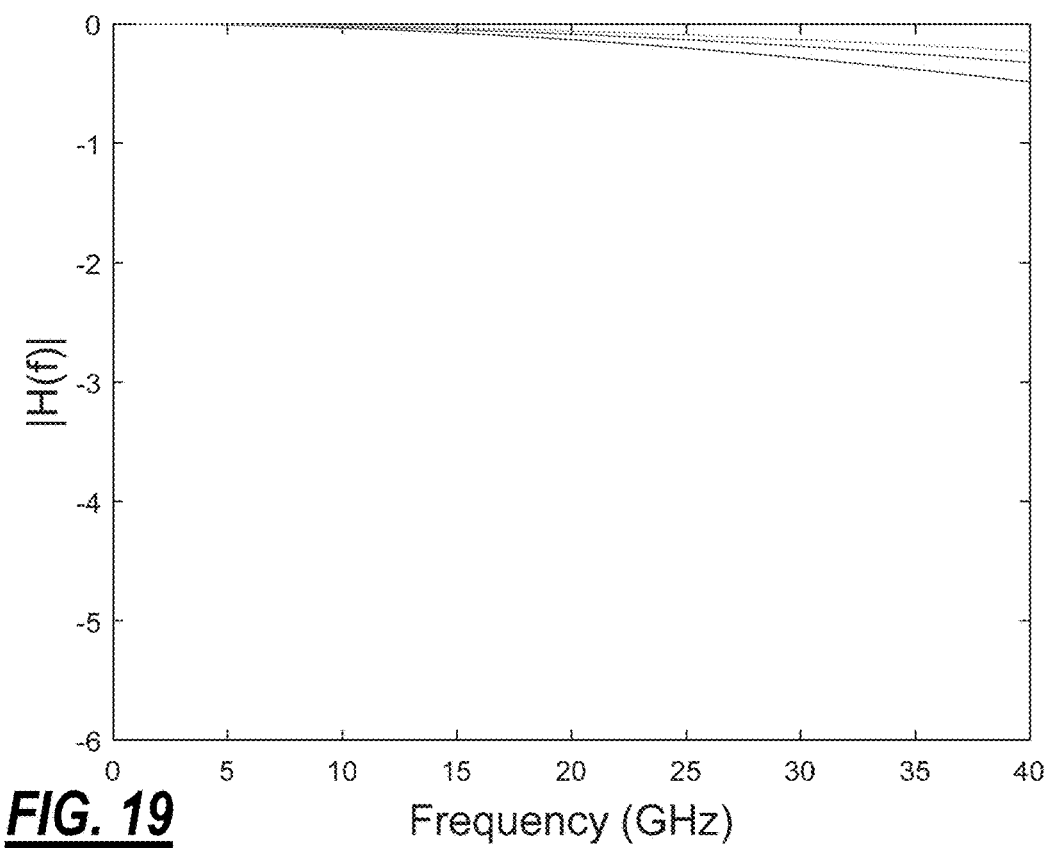
FIG. 19 illustrates a graph of the response of an RC filter with a cut-off frequency of 80 GHz, 100 GHz, and 120 GHz in accordance with one or more embodiments.

FIG. 18 illustrates a diagram of the output profile from the input profile 40 of FIG. 17. The analysis can be simplified by evaluating the RC constant of three uniform sections 50, 51, 52 separately. In this situation, the central section 50 will have an access resistance (in Ω/mm) smaller than the input profile whereas the side sections 51, 52 will have an access resistance larger than the input profile. Since the cut-off frequency of the modulator is relatively large compared to typical 3 dB bandwidth of depletion-based silicon modulator, this effect has only a minor impact on the overall bandwidth. A graph in FIG. 19 illustrates the response of an RC filter with a cut-off frequency of 80 GHz, 100 GHz, and 120 GHz. The RC filter thus has an impact of about 0.5 dB at 40 GHz, and the variation is coming from the longitudinal profile is about 0.25 dB. To conclude, at high frequencies, the PN junction in the section 51, 52 will open slightly less the PN junction in section 50. However, this effect is negligible compared to the impact of $V_n$ on the modulator bandwidth.

Figure 20A:
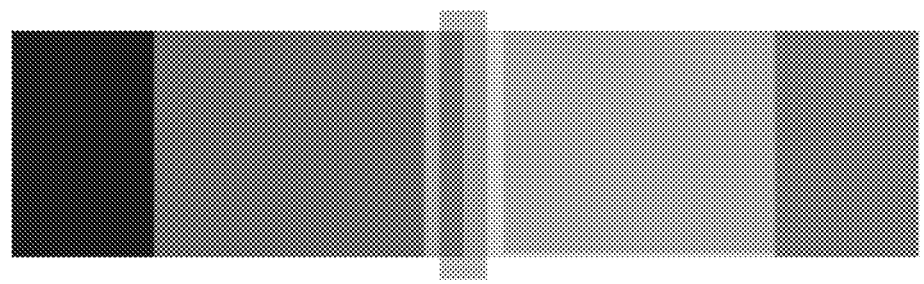
FIGS. 20A, 20B, and 20C illustrate three PN junctions with varying longitudinal profiles in accordance with one or more embodiments.
Figure 20B:
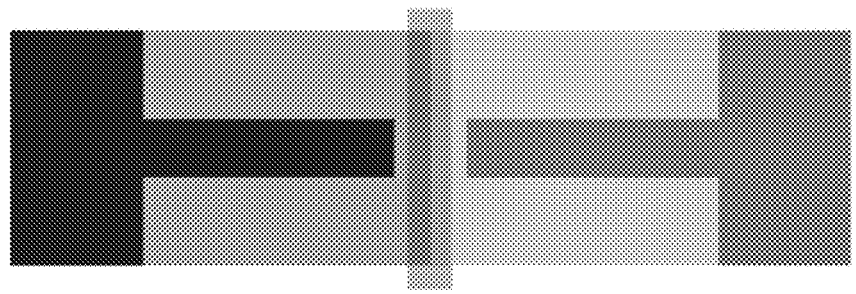
Figure 20C:
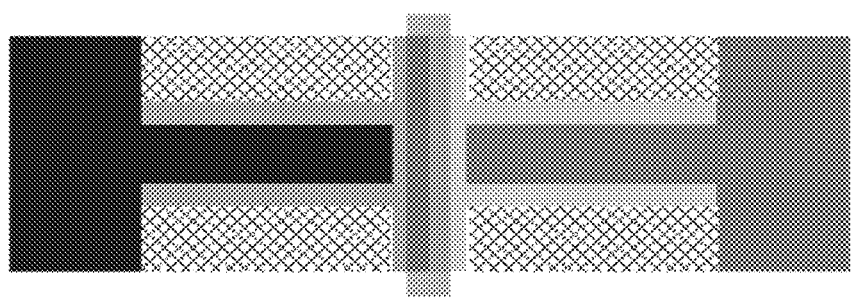

To validate the discussion above, charge carrier simulations were performed on three PN junctions 61, 62, 63 illustrated in FIGS. 20A, 20B, and 20C. The PN junction 61 has a uniform longitudinal profile. The PN junction 62 has a stepwise longitudinal profile. In this example, there is a longitudinal profile (a tooth), but the cut-off frequency in each of the regions are much larger than the modulator bandwidth. The PN junction 63 has a stepwise longitudinal profile with fully etched access regions. In this example, the silicon has been fully removed from the side of the tooth (hatched zone) to increase drastically the resistance of the side of the junction.

Figure 21:
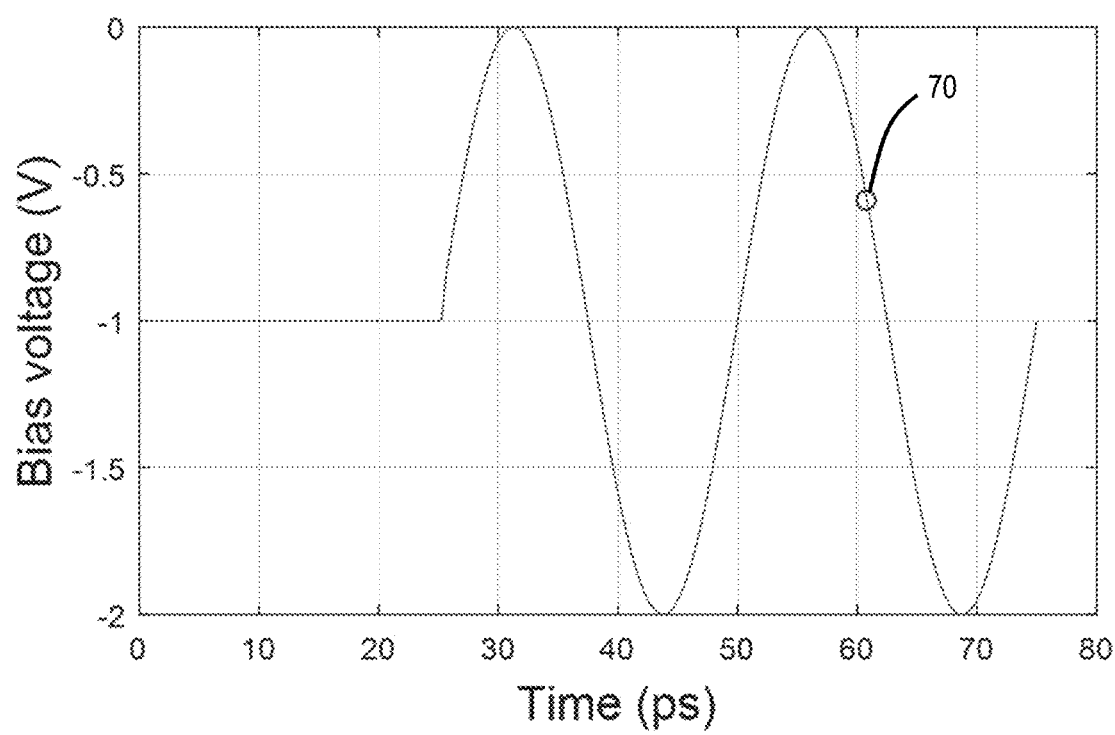
FIG. 21 illustrates a graph of time versus bias voltage for the charge carrier concentration simulation of the three PN junctions in FIGS. 20A, 20B, and 20C in accordance with one or more embodiments.

In these embodiments, the charge carrier concentration was simulated with a time-varying bias voltage. The simulation was done over two periods of a 40 GHz applied signal. FIG. 21 is a graph of time versus bias voltage for the charge carrier concentration simulation. The charge carriers around the optical waveguide are going to be shown at the time step indicated by a marker 70. The average depletion width (averaged over the full PN junction) is also going to be displayed as a function of time as follows.

Figure 22:
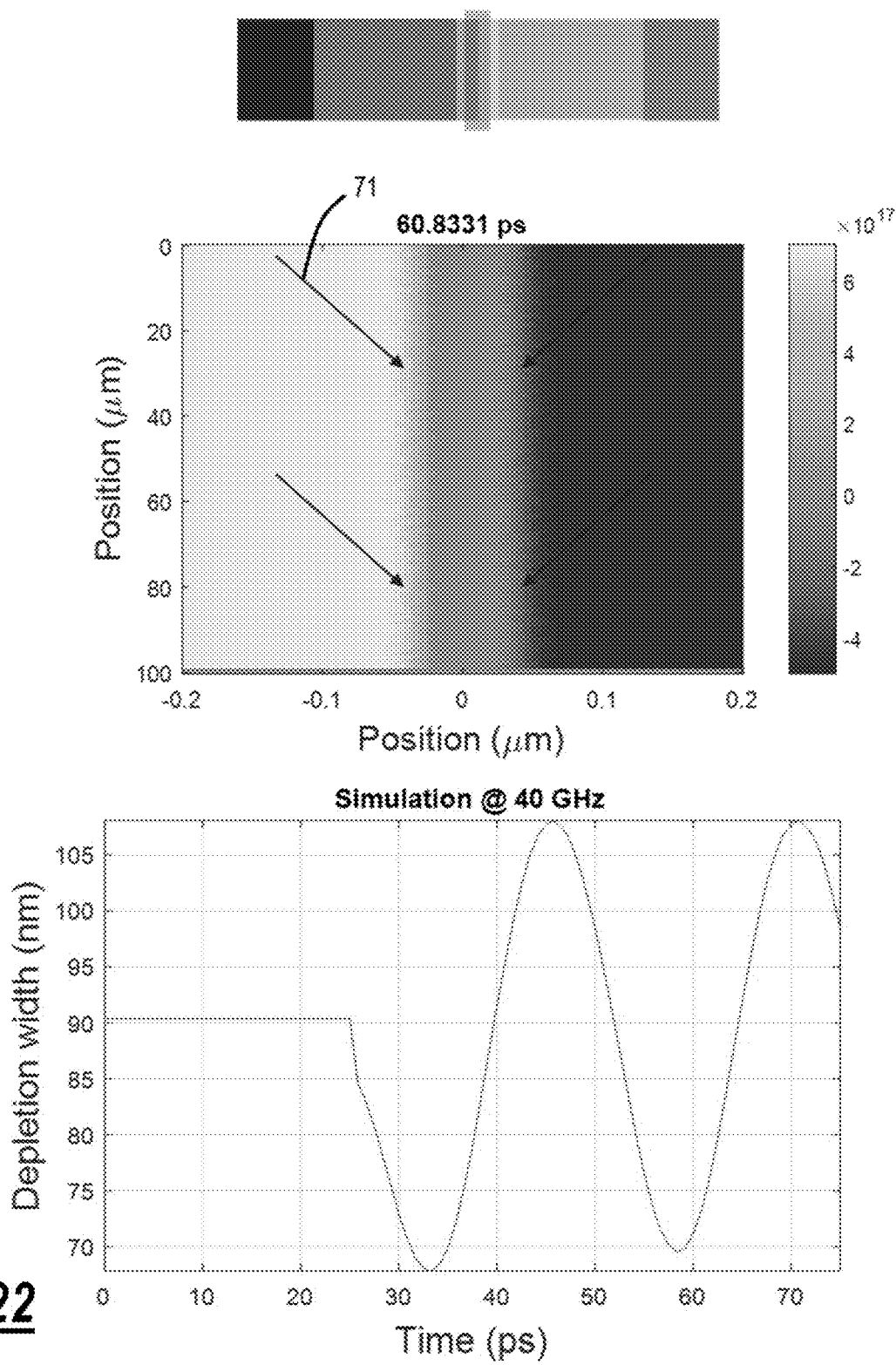
FIG. 22 illustrates a graph of the average depletion width profile as a function of time for the PN junction of FIG. 20A in accordance with one or more embodiments.

FIG. 22 illustrates a graph of the average depletion width profile as a function of time for the PN junction 61 of FIG. 20A. As expected, in this situation, it is seen that the depletion region is uniformly opened along the waveguide (arrows 71). The P dopant (positive) are on the left while the N dopant is on the right. The average depletion width profile is presented as a function of time.

Figure 23:
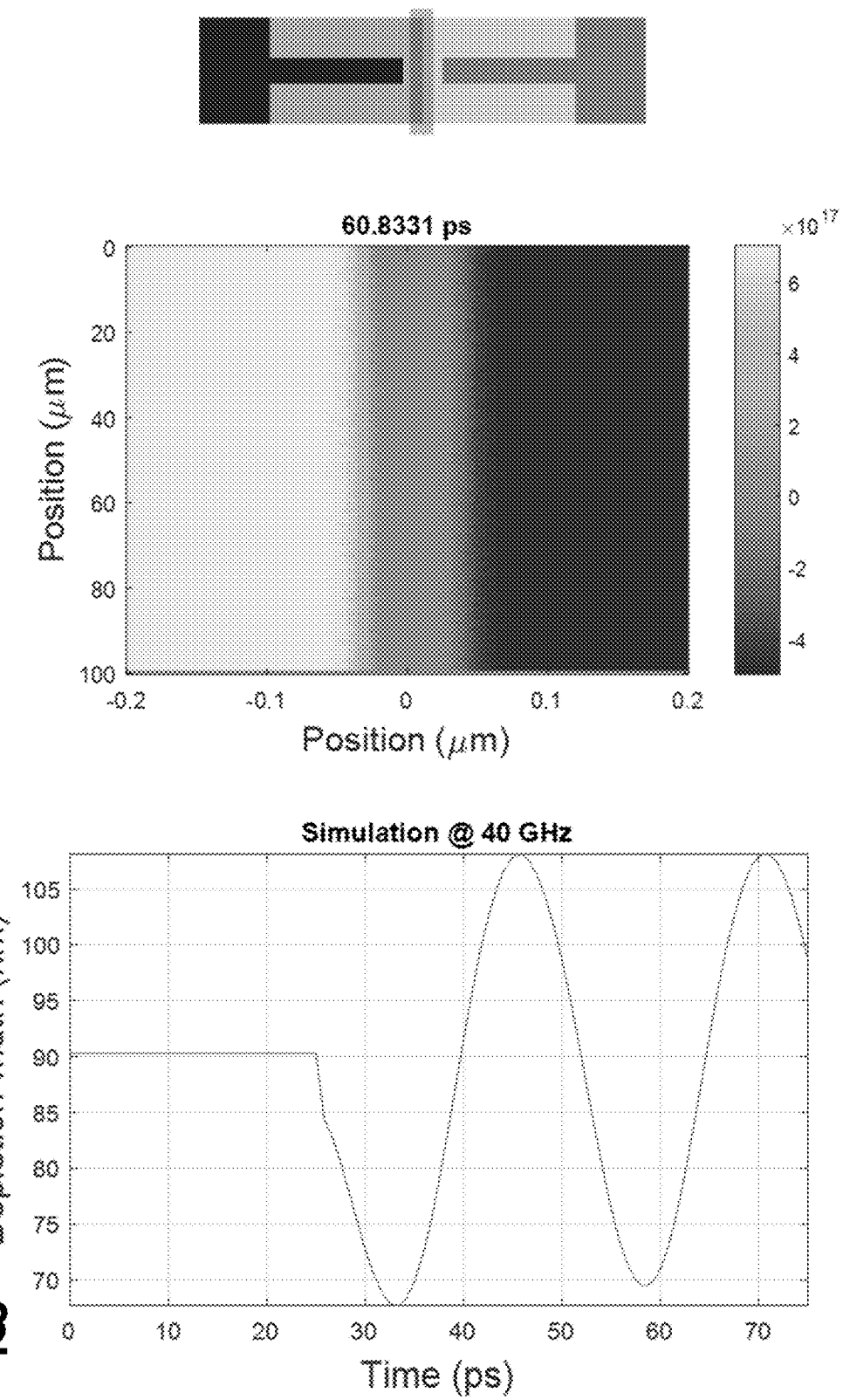
FIG. 23 illustrates a graph of the average depletion width profile as a function of time for the PN junction of FIG. 20B in accordance with one or more embodiments.

FIG. 23 illustrates a graph of the average depletion width profile as a function of time for the PN junction 62 of FIG. 20B. In this situation, it is seen that the depletion region is uniformly opened along the position although there is a longitudinal doping profile. The cut-off frequencies are large enough for the various regions such that the opening of the depletion region at 40 GHz seems uniform. The average depletion width profile as a function of time is identical to the one presented in FIG. 22.

Figure 24:
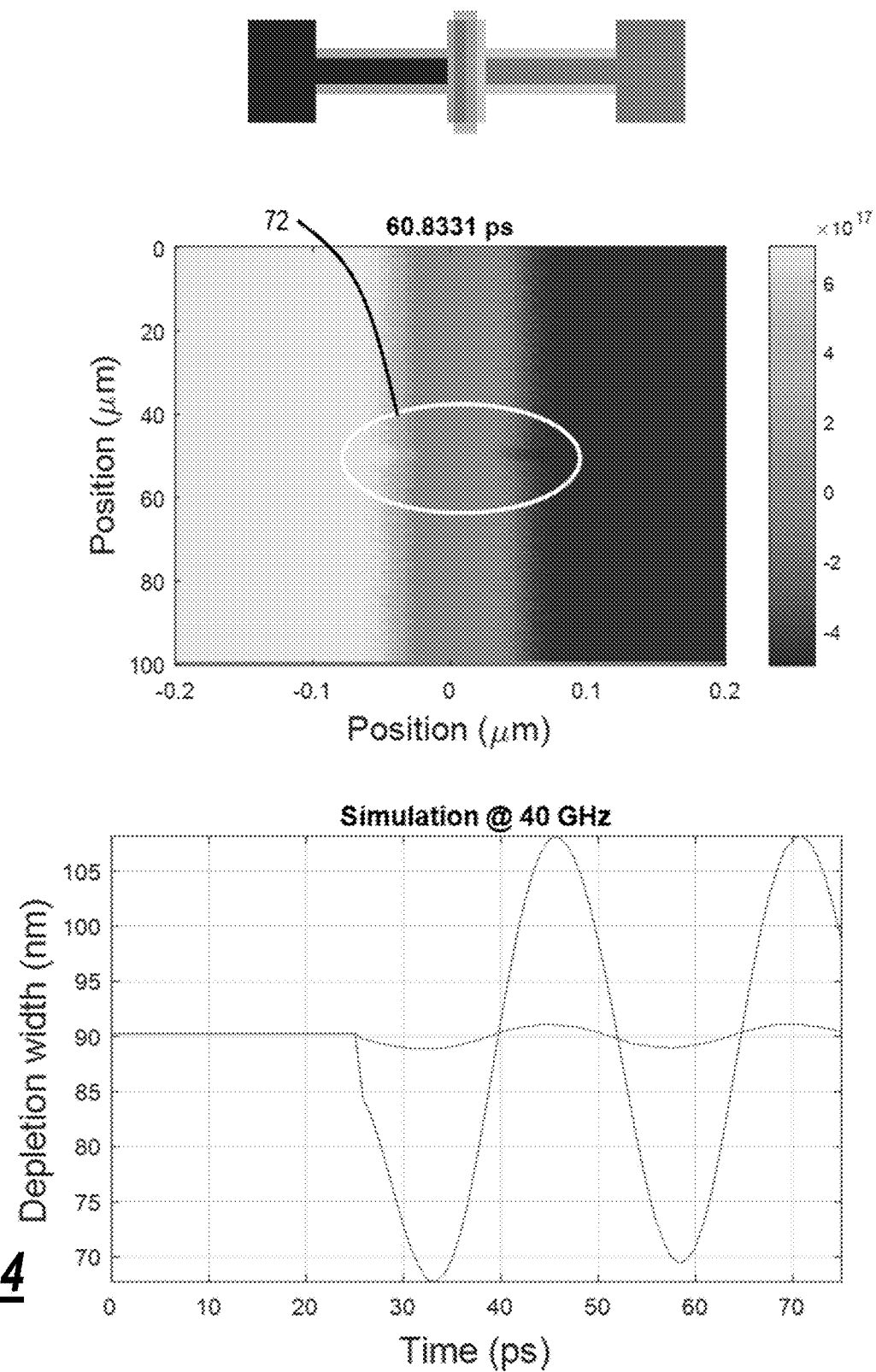
FIG. 24 illustrates a graph of the average depletion width profile as a function of time for the PN junction of FIG. 20C in accordance with one or more embodiments.

FIG. 24 illustrates a graph of the average depletion width profile as a function of time for the PN junction 63 of FIG. 20C. In this situation, it is seen that the depletion region is not uniform along the position because the RC filter in the outer region is very large. The PN junction opens only in the center (circle 72) where the access silicon slab is not fully etched. The average depletion width is thus much smaller than the two precedent cases (i.e., the depletion width is not modulated on the side and varies only in the center). Note that the opening of the depletion region at the center is exactly the same as in the two previous cases. These simulations prove that the discussion on the impact of the longitudinal profile on the EO response is valid.

Implementing a laterally varying dopant profile into a longitudinally varying profile is relevant because The optical losses remain the same;

The DC Vπ is not influenced by the access resistance of the junction. Thus the DC Vπ is also not changed; and The EO bandwidth is also very similar. As mentioned before:

From a macroscopic point of view, if the total resistance of the output profile is equal to the input profile, the RF loss will be identical (i.e., the terms Vn will be identical).

From a microscopic point of view, the RC filter equation of each segment will be slightly affected by the longitudinal variation of the dopant. Some areas have lower access resistance than some other areas. However, this effect is negligible in the case that interests us (where the RC cut-off frequency>>modulator bandwidth). Thus, for an equivalent resistance, the EO bandwidth of a longitudinally varying profile remains the same.

To evaluate the resistance of a longitudinal profile, the dopant P and N are calculated independently. Each profile is separated into M sections in the Z-axis, and the resistance is calculated considering each section as independent parallel circuits. So, the total resistance is given by $$R_{tot} = \left(\sum_{m=1}^{M} \frac{1}{R_m}\right)^{-1} \quad (17)$$

Figure 25A:
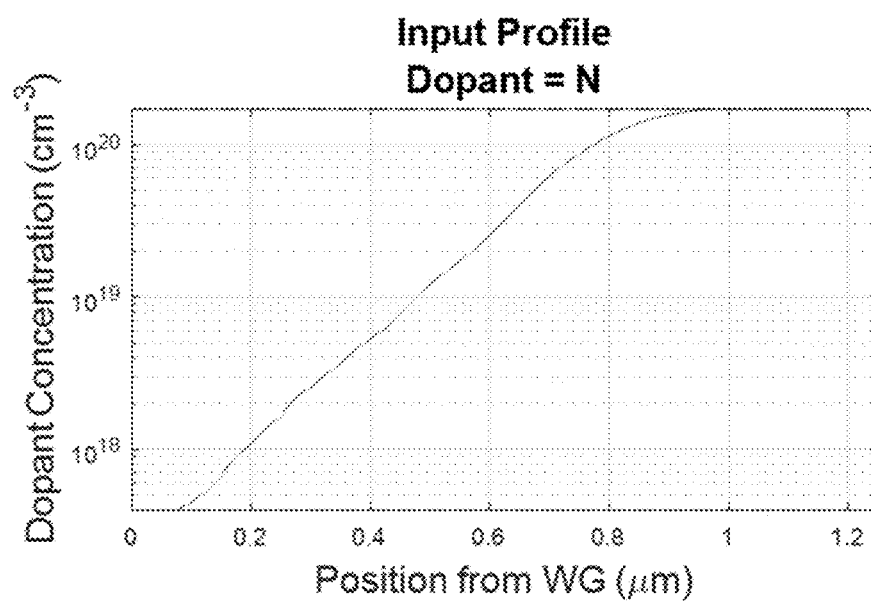
FIGS. 25A and 25B illustrate a first example embodiment with an input profile and output profile in accordance with one or more embodiments.
Figure 25B:
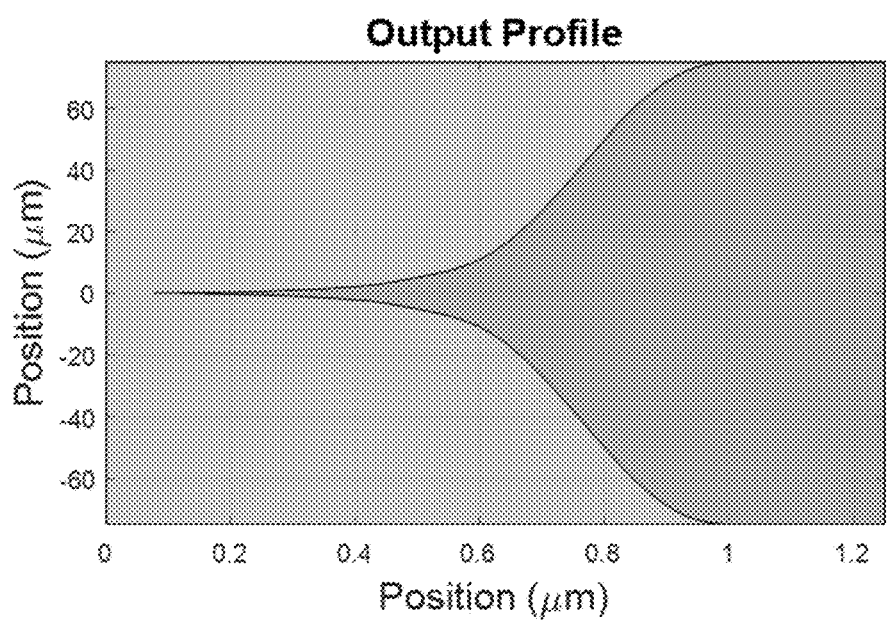

FIGS. 25A and 25B illustrate a first example embodiment with an input profile and output profile. The input profile has N dopant optimized lateral dopant (OL=1.1 dB/cm) and two doping levels. The input resistance is 8.5 Ω/segments, and the output resistance is 17.7 Ω/segments. Two levels of the longitudinal profile are used to implement this optimized lateral profile, but this is not good enough. However, the non-optimized resistance of a current modulator is 15Ω. Thus, the performance of this output profile is close to a three-level non-optimized lateral profile.

Figure 26A:
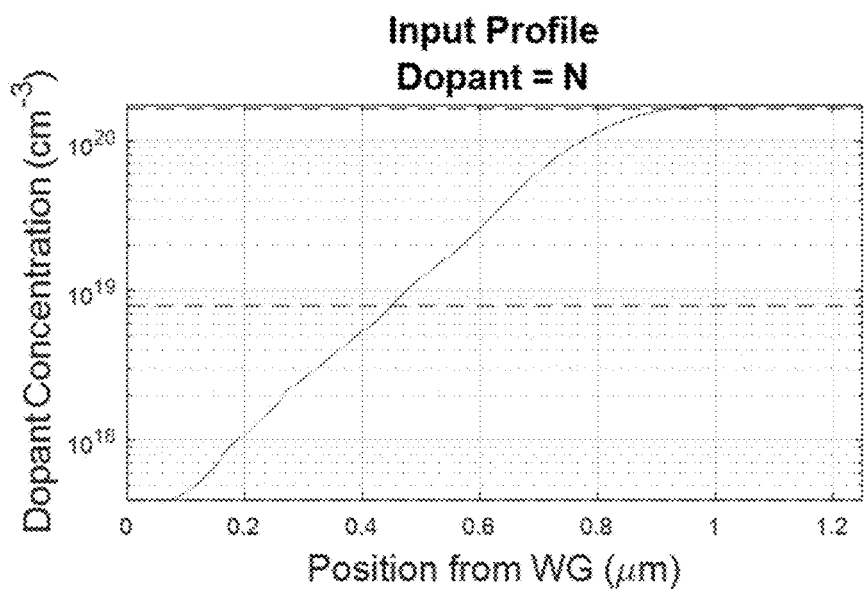
FIGS. 26A and 26B illustrate a second example embodiment with an input profile and output profile in accordance with one or more embodiments.
Figure 26B:
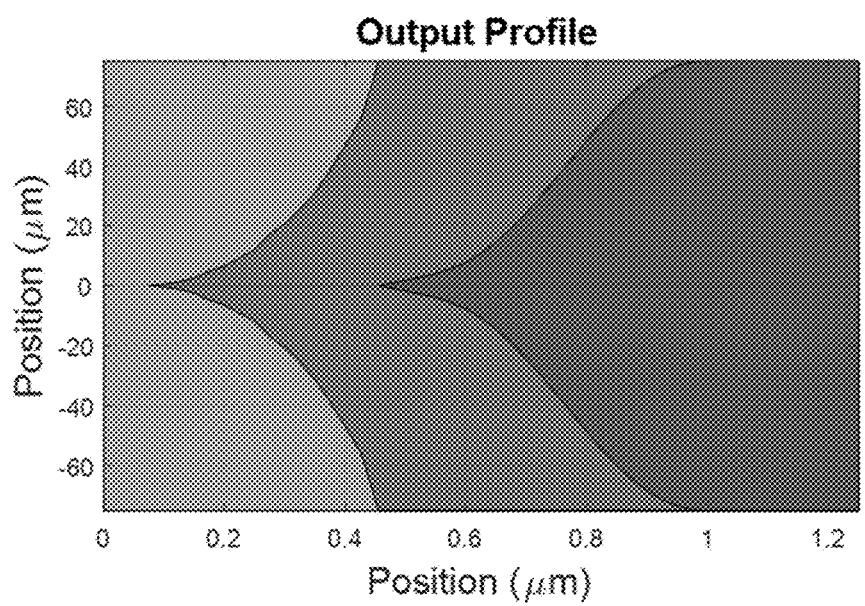

FIGS. 26A and 26B illustrate a second example embodiment with an input profile and output profile. The input profile has N dopant optimized lateral dopant (OL=1.1 dB/cm) and three doping levels. The input resistance is 8.5 Ω/segments, and the output resistance is 10.2 Ω/segments. The actual non-optimized resistance is 15Ω. Thus, using a three-level longitudinal profile to implement an optimized lateral profile provides significant improvement.

Figure 27A:
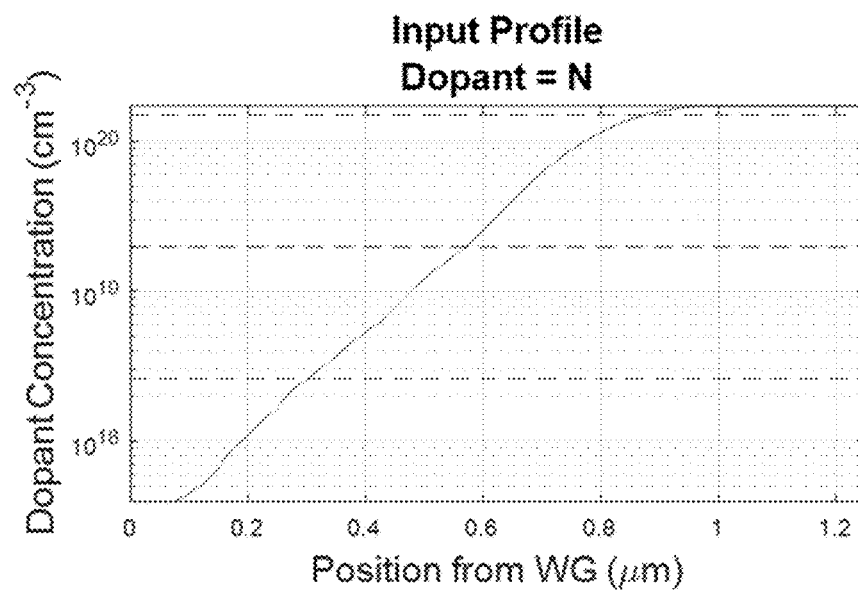
FIGS. 27A and 27B illustrate a third example embodiment with an input profile and output profile in accordance with one or more embodiments.
Figure 27B:
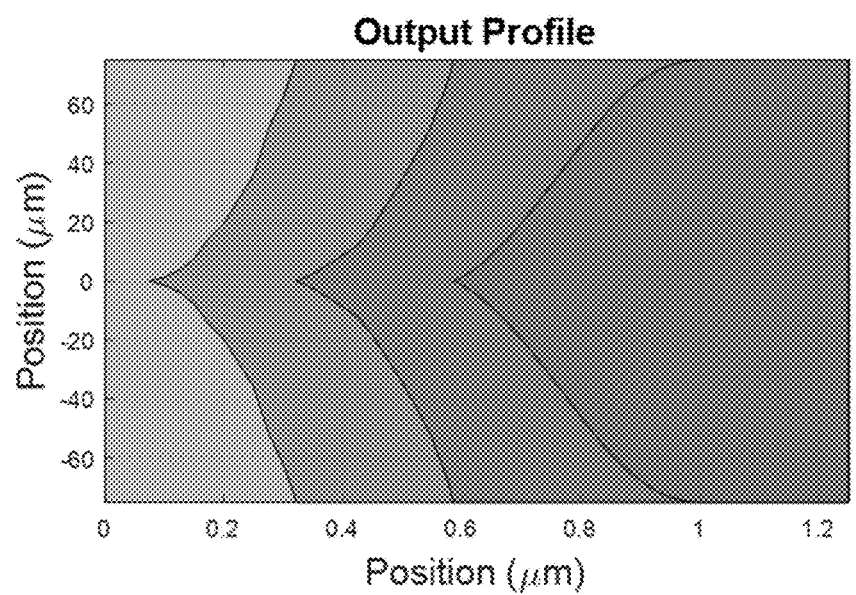

FIGS. 27A and 27B illustrate a third example embodiment with an input profile and output profile. The input profile has N dopant optimized lateral dopant (OL=1.1 dB/cm) and four doping levels. The input resistance is 8.5 Ω/segments, and the output resistance is 8.9 Ω/segments. Thus, this output profile has a resistance almost identical to the input profile. It can be concluded that as the number of doping levels increase, the output profile access resistance tends to the value of the input profile. However, a significant gain can already be obtained with three doping levels. Similar simulations were obtained with P-type dopant.

Figure 28A:
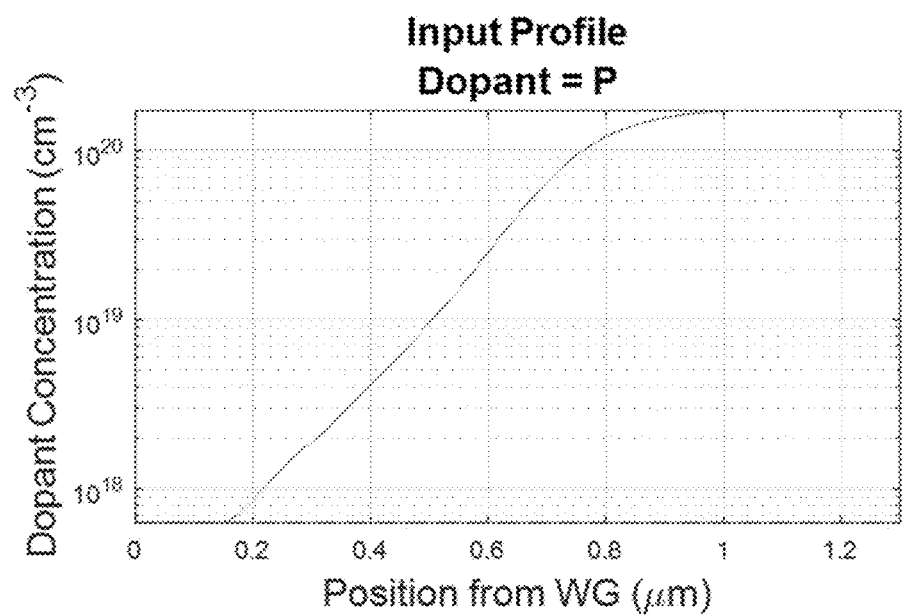
FIGS. 28A and 28B illustrate a fourth example embodiment with an input profile and output profile in accordance with one or more embodiments.
Figure 28B:
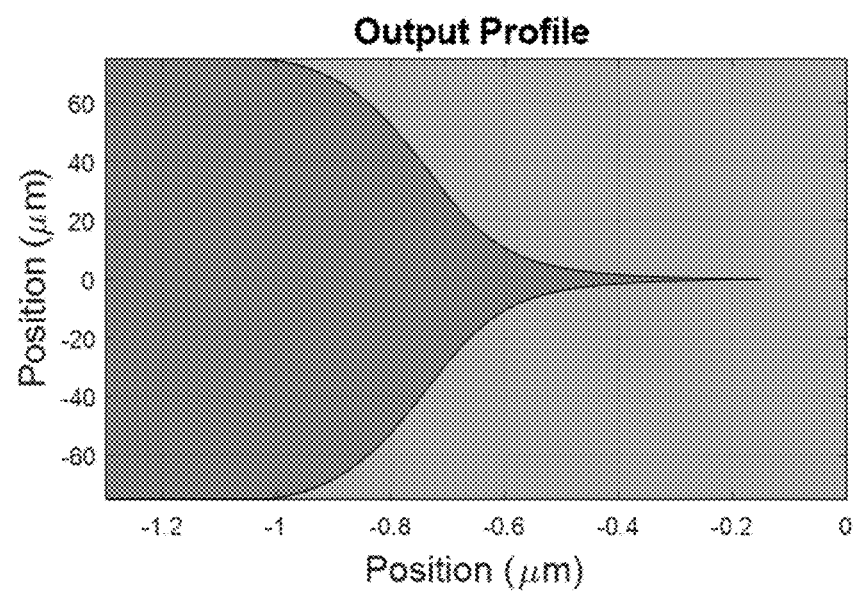

FIGS. 28A and 28B illustrate a fourth example embodiment with an input profile and output profile. The input profile has N dopant optimized lateral dopant (OL=0.92 dB/cm) and two doping levels. The input resistance is 16.1 Ω/segments, and the output resistance is 28.9 Ω/segments. Here, using two levels of the longitudinal profile to implement an optimized lateral profile is not good enough. However, the non-optimized resistance of a current modulator is 26Ω. Thus, the performance of this output profile is close to a three-level non-optimized lateral profile.

Figure 29A:
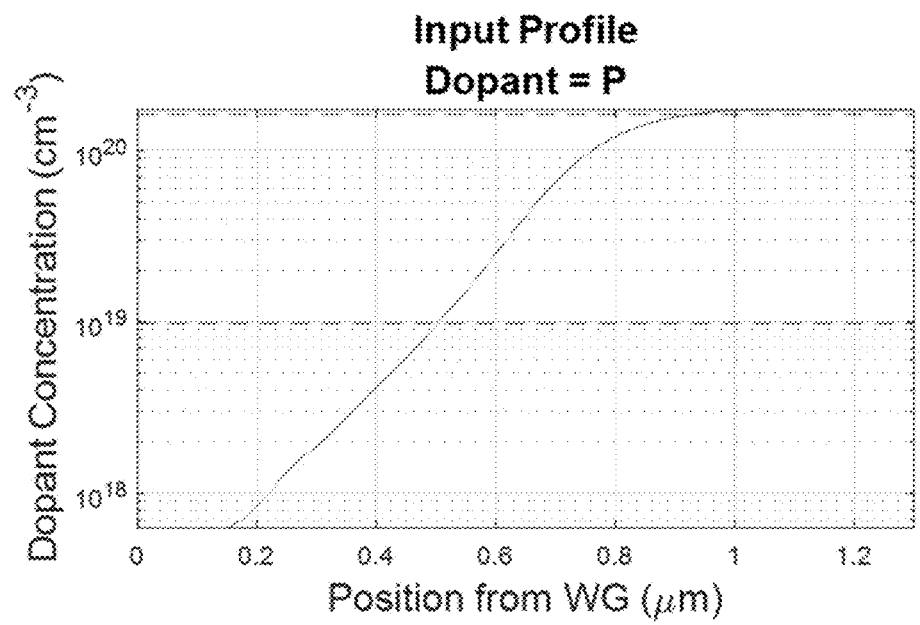
FIGS. 29A and 29B illustrate a fifth example embodiment with an input profile and output profile in accordance with one or more embodiments.
Figure 29B:
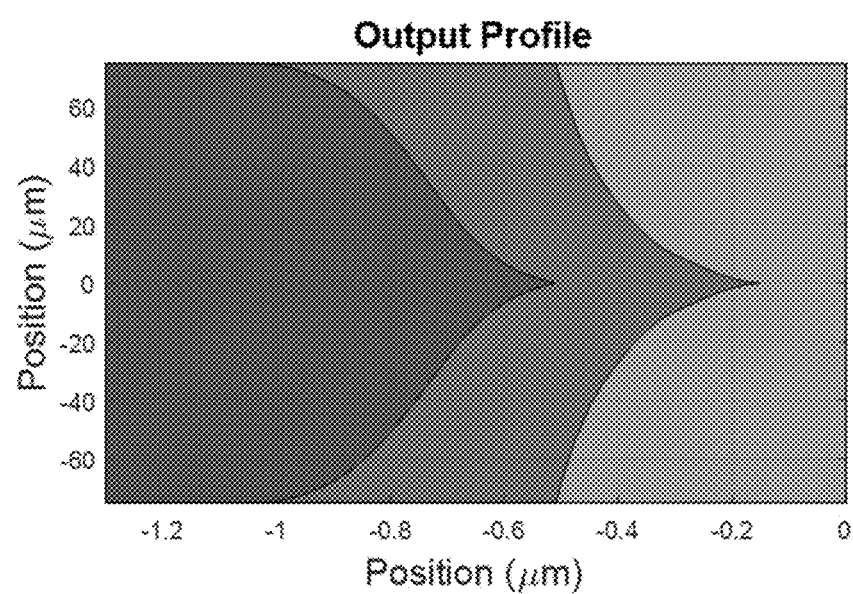

FIGS. 29A and 29B illustrate a fifth example embodiment with an input profile and output profile. The input profile has N dopant optimized lateral dopant (OL=0.92 dB/cm) and three doping levels. The input resistance is 16.1 Ω/segments, and the output resistance is 18.8 Ω/segments. The actual non-optimized resistance is 26Ω. Thus, using three levels of the longitudinal profile to implement an optimized lateral profile provides significant improvement.

Figure 30A:
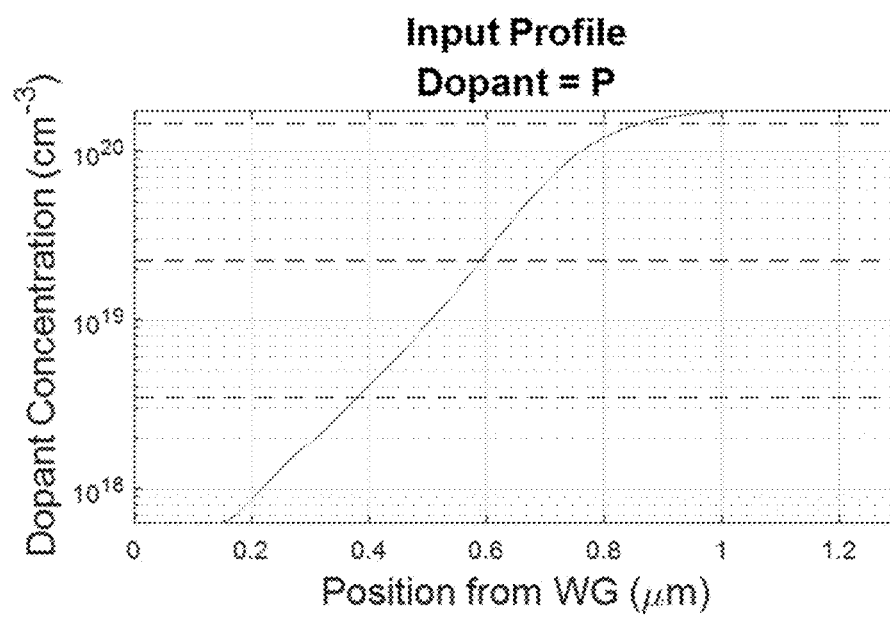
FIGS. 30A and 30B illustrate a sixth example embodiment with an input profile and output profile in accordance with one or more embodiments.
Figure 30B:
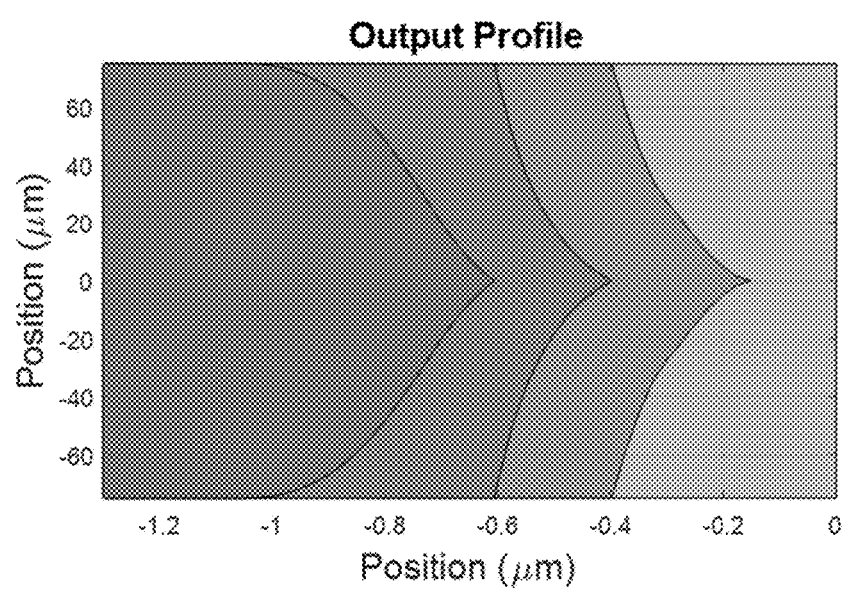

FIGS. 30A and 30B illustrate a sixth example embodiment with an input profile and output profile. The input profile has N dopant optimized lateral dopant (OL=0.92 dB/cm) and four doping levels. The input resistance is 16.1 Ω/segments, and the output resistance is 16.9 Ω/segments. The output profile has a resistance almost identical to the input profile.

Again, an optical modulator could be significantly improved by optimizing the lateral dopant profiles. Such profiles might, however, require process development effort. It has been shown that a custom lateral implantation profile could be implemented using a longitudinal variation of the dopant without degrading the other figure-of-merits of the optical modulator (optical losses, Vπ and EO bandwidth) since the access resistance is kept the same (when the number of doping level are >2).

This approach is thus beneficial in two situations: 1) to improve the modulator performances by mimicking more complex lateral profile having lower access resistance while keeping the fabrication process simple, and 2) to keep the performance of the modulator as they are with only two doping levels.

Figure 31:
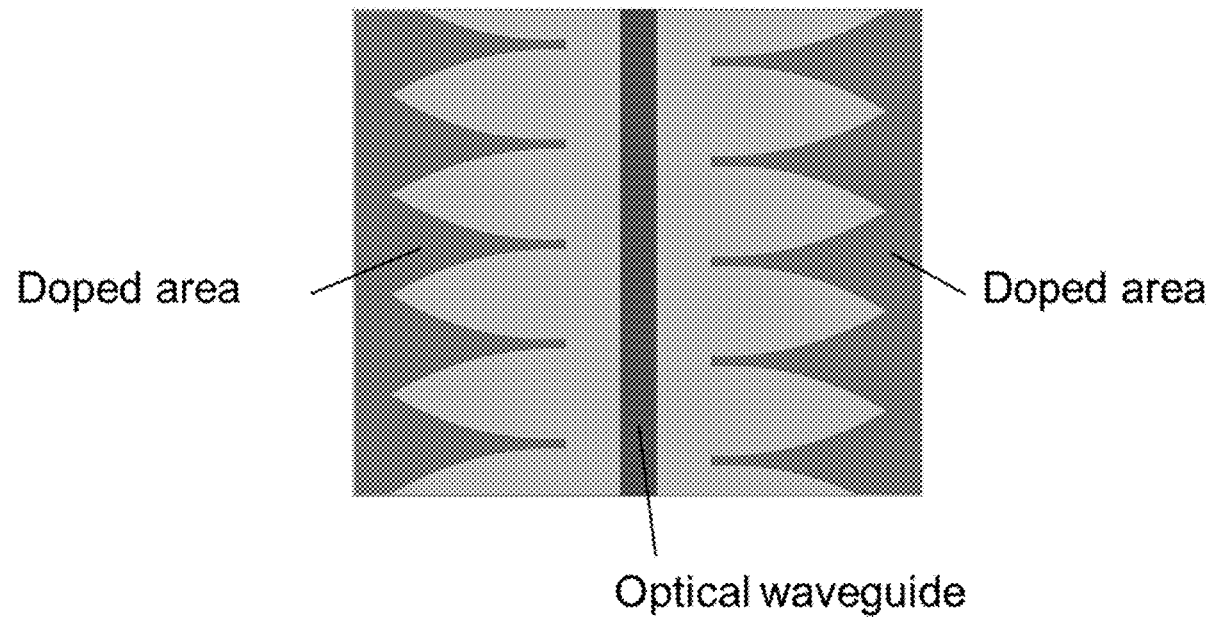
FIG. 31 illustrates a top view of another embodiment of a longitudinally varying profile in accordance with one or more embodiments.

FIG. 31 illustrates a top view of another embodiment of a longitudinally varying profile. Again, it is shown using longitudinal variations of the doped area to replicate various lateral doping profiles.

Figure 32A:
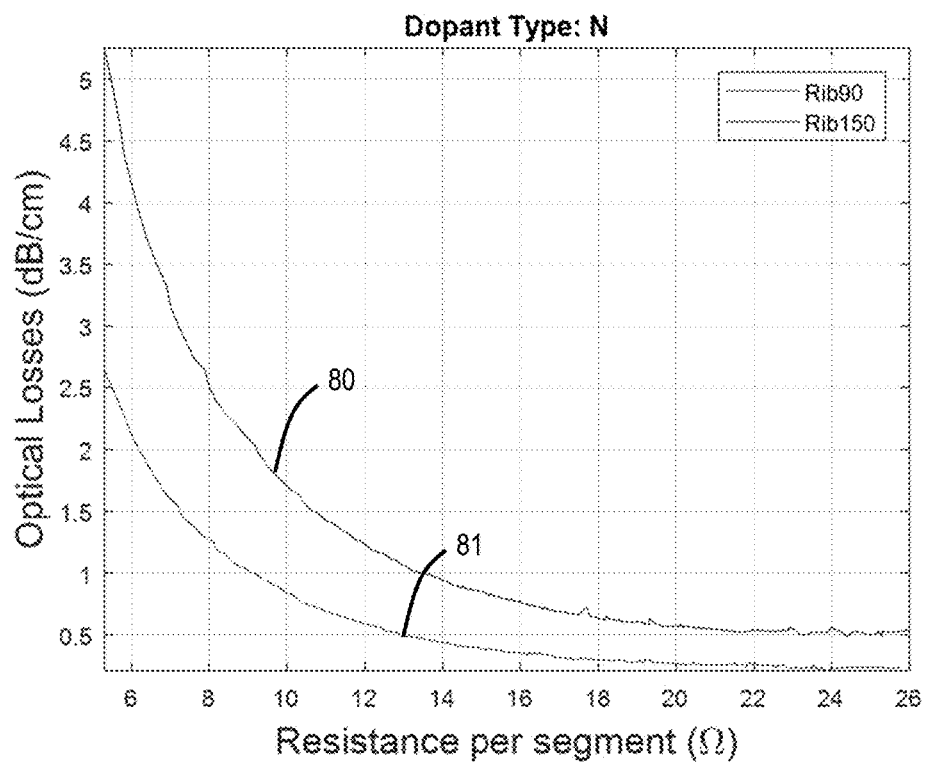
FIGS. 32A and 32B illustrate graphs of N (FIG. 32A) and P (FIG. 32B) dopants illustrating optical losses as a function of resistance per segment in accordance with one or more embodiments.
Figure 32B:
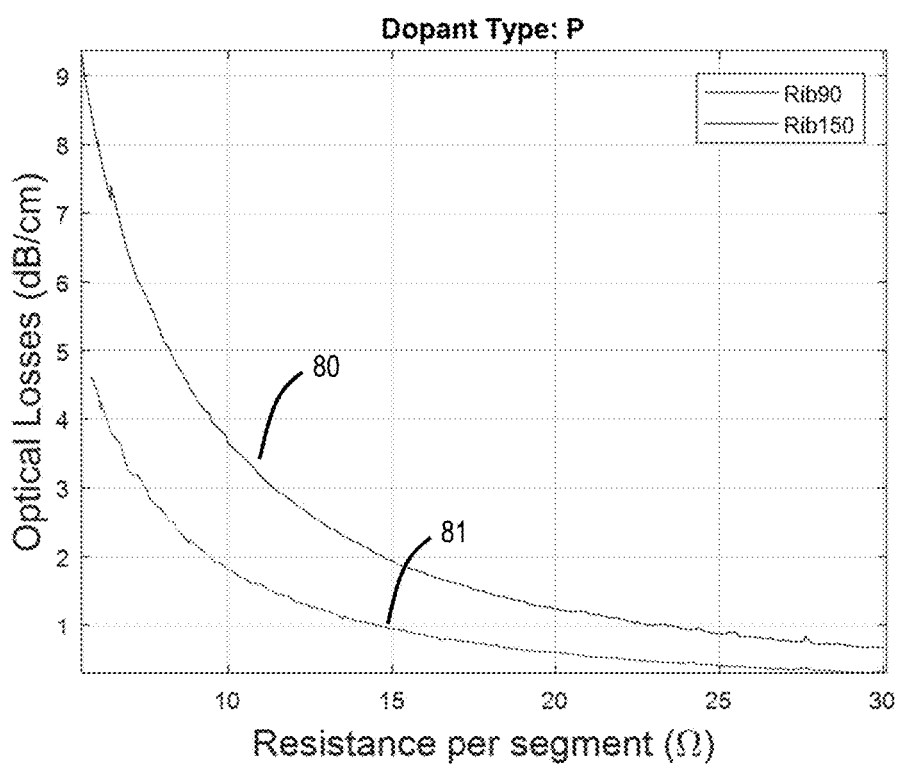

FIGS. 32A and 32B illustrate graphs of N (FIG. 32A) and P (FIG. 32B) dopants illustrating optical losses as a function of resistance per segment. The optimization process has also been run on another slab thickness. The other slab thickness is 150 nm (line 81) (it was 90 nm in the previous examples (line 80)). A thicker slab has a lower access resistance, but, at the same time, the optical mode is less confined in the center part of the waveguide. As a result, the optical loss is larger. Before running this optimization process, it was not clear which of the two aspects was dominating. As seen in FIGS. 32A and 32B, it is clear now that a thinner slab is more advantageous.

Reduction of Silicon Modulator Access Resistance with Silicon Slab Thickness Optimization In one or more embodiments, instead of having a slab-shaped transition zone 2 with a uniform thickness along the longitudinal/lateral direction, the transition zone 2 may be designed to have varying thickness. More specifically, in the second example, the slab thickness is varied on each side of the modulator to reduce the contact resistance of the overall structure. FIGS. 33A, 33B, 34A, and 34B show, in cross-section, various configurations for varying the slab thickness in accordance with one or more embodiments disclosed herein. Other configurations are possible, for example, thickness variation in the longitudinal direction (not shown). For clarity, different thickness variations can be employed in either lateral and longitudinal directions or in both directions (not shown), the lateral and longitudinal directions are relative to the waveguide core 1.

Figure 33:
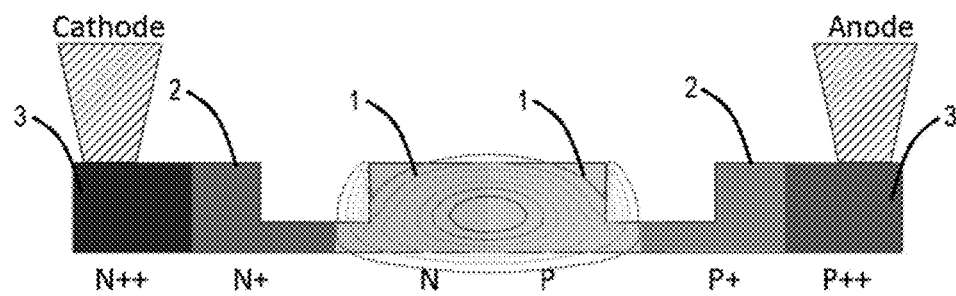
FIGS. 33A and 33B illustrate a single mode silicon modulator with varying transition zone thickness in accordance with one or more embodiments.
Figure 33:
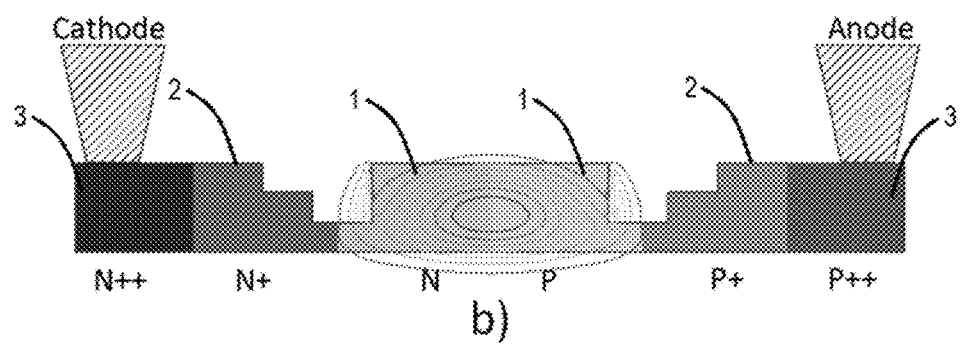

FIGS. 33A and 33B show configurations where the slab thickness is increased close to the electrodes with two and three silicon thickness levels respectively. In these cases, the resistance of the N+/P+ regions 2 is decreased by a factor of two assuming a uniform doping profile which will translate into a modulator bandwidth improvement. In some configurations, the reduction of the contact resistance by ~10Ω will improve the modulator bandwidth by ~5 GHz, such improvement is not negligible. These configurations do not significantly modify the optical mode profile and the effective index compared to the modulator shown in FIG. 1A-1C because the etching of the silicon layers (which defines the waveguide) is wide enough to confine the optical mode (typically ~200-300 nm).

Figure 34:
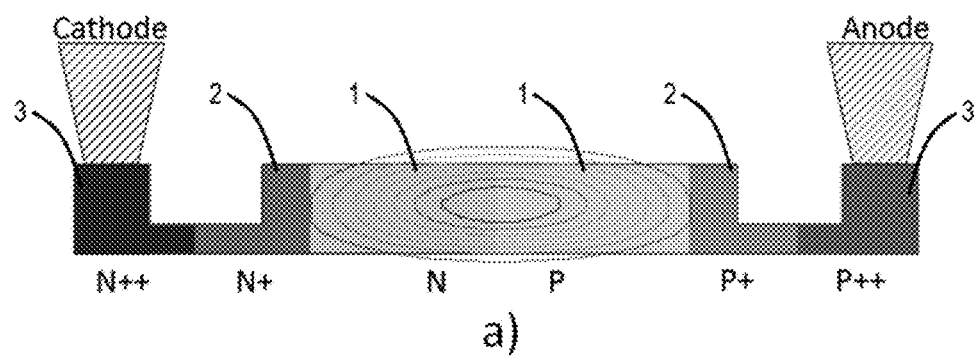
FIGS. 34A and 34B illustrate a multimode silicon modulator with varying transition zone thickness in accordance with one or more embodiments.
Figure 34:
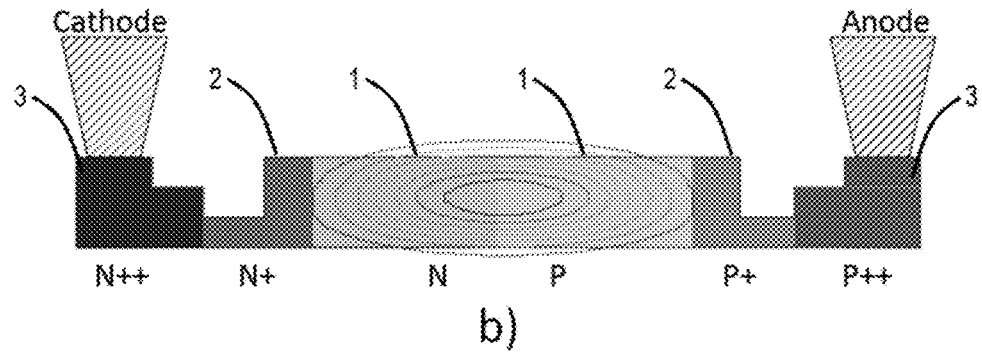

FIGS. 34A and 34B show other configurations where the transition zone 2 (the region where the optical mode is exponentially decaying) begins where the silicon layer is still thick approaching the thickness of the waveguide. Typically, such optical waveguide will support more than one propagating mode. These configurations are particularly interesting because the thin transition zone 2 (which confines the optical modes) is only composed of highly doped silicon. As a result, the sections where the resistance is the highest in FIG. 1 (i.e., the thin P/N doped sections) are completely removed which considerably reduces the contact resistance. Further, optimization of this design may be undertaken to prevent higher order mode excitation, for example by adiabatically coupling into the first propagation mode or by adjusting the dopant profiles to selectively attenuate the high order propagation modes.

The thickness variation of the transition zone 2 may be chosen such that its longitudinal average agrees with the optimum lateral doping profile described herein. In accordance with the second example, modifying the slab thickness allows one to reduce the contact resistance of the overall structure even more without significantly degrading the propagation losses. Reducing the contact resistance is important to reach higher modulation bandwidth.

For the purpose of illustration, the thickness variation is shown to be right-angled steps in FIGS. 33A-33B and 34A-34B. Nevertheless, it would be readily appreciated by one skilled in the art that other shapes of thickness variation, such as straight-line slopes, curvy-line slopes, or the combination thereof, may also be used.

For the purpose of illustration, FIGS. 33A-33B and 34A-34B only depict one and two changes in thickness, respectively. Nevertheless, it would be readily appreciated by one skilled in the art that the number of thickness changes may be greater than 3. Further, FIGS. 33A-33B and 34A-34B illustrate how to reduce the contact resistance of a silicon modulator using a lateral PN junction as an example. However, it would be readily appreciated by one skilled in the art that the technique described above in the second example may be applied to other types of junction geometries.

Further, in one or more embodiments, a silicon modulator may be designed to combine the features of the first example and the second example, so that the transition zone 2 has both a varying longitudinal/lateral doping concentration and a varying longitudinal/lateral thickness. Such a combination of features from the two examples may decrease the contact resistance even further for a given optical loss.

Silicon Slab Thickness Optimization—Quantified

The thickness of the slab area for the transition zone 2 can be varied to improve the access resistance of the modulator while maintaining the optical losses constant. Conversely, the thickness of the slab area can be varied to improve the optical loss of the modulator for a specific access resistance. This is similar to the optimizations described herein for the lateral and longitudinal profiles.

To evaluate the above statements, the optical mode profile was calculated and the fraction of power inside the slab and inside the core of the waveguide was calculated. If the optical power in the slab is smaller, it means that the silicon can be doped more heavily with smaller impact on the optical mode which results in either a faster modulator or a modulator with lower optical losses. A full modulator simulation was also performed. The figure of merits of the modulator (optical losses, Vpi and EO BW) are compared to a legacy modulator.

With proper thickness choices, using a slab waveguide in the transition regions 2 with notches on the side allows an improvement in the mode confinement, a reduction of the optical power concentrated inside the slab area, and, as a result, the modulator performances can be significantly improved. The actual designs show an improvement between 2 GHz and 3 GHz. Considering the limited improvement that can be made on Si based modulator, a few GHz improvement can be the difference between a working chip or a "failed chip."

Optical Mode Profile Evaluation

FIGS. 35-38 are cross-sectional diagrams of various modulators with the waveguide core 1 and the transition regions 2 and associated calculated optical mode illustrating different slab thicknesses in the transition regions 2. FIG. 35 is a baseline modulator with no slab thicknesses variations in the transition regions 2. The cross-sectional diagram includes the waveguide core 1 and the transition regions 2 and a cladding 80, such as a SiO$_2$ cladding. In an embodiment, the waveguide code 1 is 220 nm thick and 500 nm wide; the slab in the transition regions 2 has a thickness of 90 nm. The optical mode is used to calculate the Poynting vector. The important values for this baseline modulator are the fraction of the mode in the 500 nm×220 nm core (72.1%) and the portion of the mode inside the slab (3.8%).

FIG. 36 includes a transition region 2 with the slab thickness varied on two levels. The thin slab is 90 nm and the thick slab is 150 nm. Here, it is seen that the optical mode is slightly less confined (71.3% instead of 72.1%), but the amount of optical power inside the slab is even larger than the baseline (4.3% instead of 3.8%). The amount of optical power can be made equal to the baseline in the slab by increasing the value Δw. However, Δw is too large and this new waveguide geometry does not provide access resistance benefit. As a result, this approach was not so useful.

FIG. 37 includes a transition region 2 with the slab thickness varied on two levels, but with smaller thicknesses from FIG. 36. Specifically, the thin slab is 50 nm and the thick slab is 90 nm. Here, it is seen that the optical mode is more confined (76.2% instead of 72.1%), but, more importantly, the amount of optical power inside the slab is much lower (0.7% instead of 3.8%). This is able to improve the EO bandwidth of the modulator while involving relatively simple process changes.

FIG. 38 includes a transition region 2 with a varied geometry from FIG. 37, namely Δw is much smaller while the thicknesses are the same from FIG. 37. Here, it is seen that the optical mode is still more confined (74.7% instead of 72.1%) compared to the baseline, but less than the previous case in FIG. 37. More importantly, the amount of optical power inside the slab is still much lower than the baseline (1.2% instead of 3.8%).

Full Modulator Simulation

Figure 39:
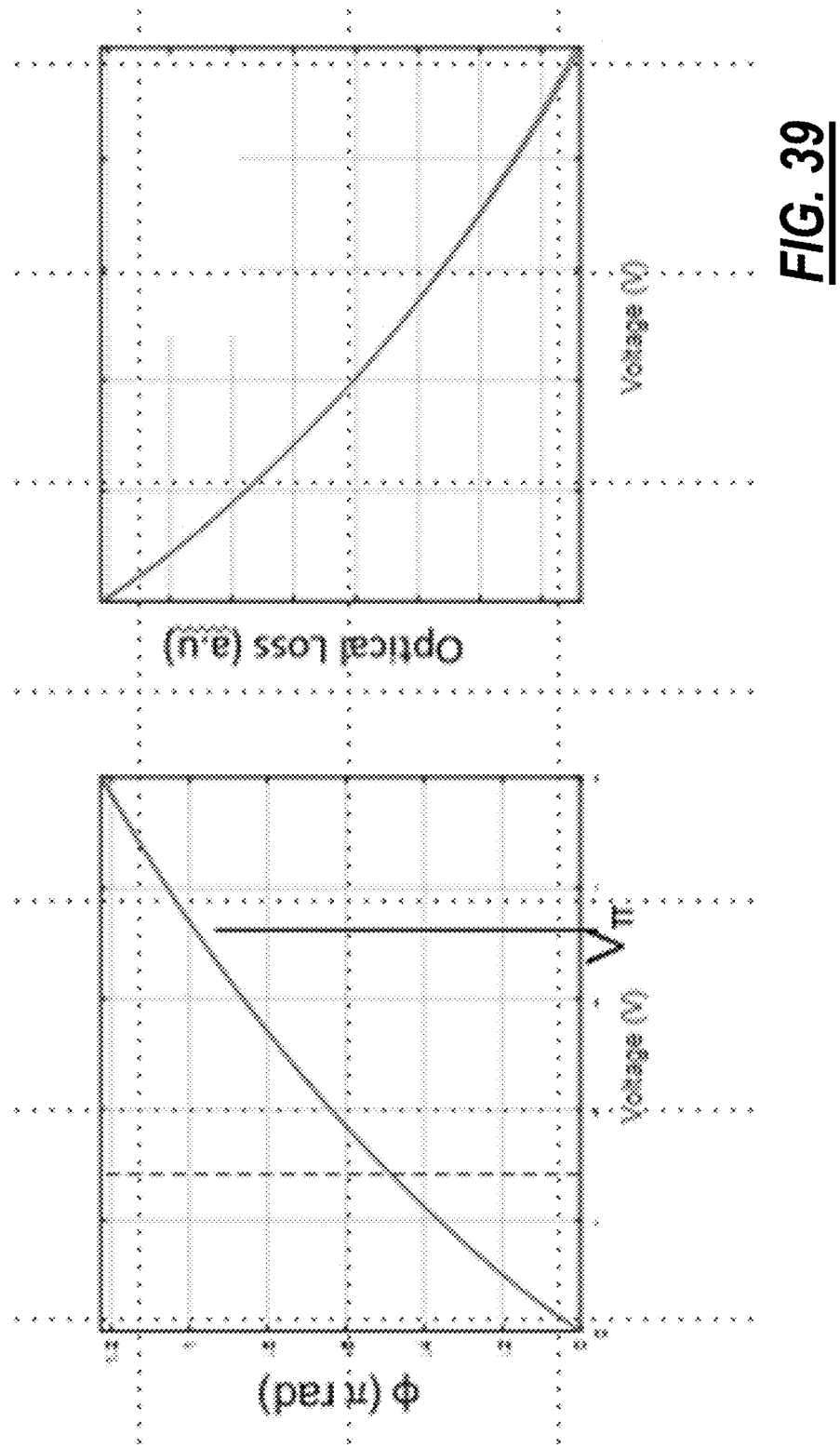
FIG. 39 illustrate graphs of a full modulator simulation for illustrating different slab thicknesses in the transition regions in accordance with one or more embodiments.

FIG. 39 shows a reference modulator and a second modulator utilizing various slab thicknesses in the transition region 2 (structure shown in FIG. 38). The modulator using various slab thickness has the same phase response (same Vpi) and OL as the baseline modulator that uses a uniform 90 nm thick slab. However, the access resistance is smaller for the same optical loss which results in this example in a 2 GHz improvement in the EO bandwidth. To match both modulators, the implantation recipes and the mask position of these layers were finely tuned.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A silicon-based modulator comprising:
   a waveguide core that is a PN junction region;
   a first transition zone that is a P-side region adjacent to the waveguide core, the first transition zone has a first longitudinal doping profile; and
   a second transition zone that is an N-side region adjacent to the waveguide core on an opposite side as the first transition region, the second transition zone has a second longitudinal doping profile;
   wherein at least one of the first longitudinal doping profile and the second longitudinal doping profile has a variation of doping concentration along a longitudinal direction that extends a length parallel to the waveguide core and first and second electrical contacts.

2. The silicon-based modulator of claim 1, wherein the variation of doping concentration is formed by a plurality of areas of different doping concentrations in the longitudinal direction.

3. The silicon-based modulator of claim 1, wherein the variation of doping concentration results in one of lower optical losses for a given access resistance and lower access resistance for a given optical loss.

4. The silicon-based modulator of claim 1, wherein the waveguide core has a p-type doping of p and first electrical contact has a p-type doping of p++ such that the first transition zone has k (k≥2) divisions $P_1, P_2, \ldots P_k$, each division effectively uniformly doped at a concentration level $p_1, p_2, \ldots p_k$, respectively, such that $p \leq p_1 < p_2 \ldots < p_k \leq p++$, and wherein the waveguide core has an n-type doping of n and the second electrical contact has an n-type doping of n++ such that the second transition zone has k (k≥2) divisions $N_1, N_2, \ldots N_k$, each division effectively uniformly doped at a concentration level $n_1, n_2, \ldots n_k$, respectively, such that $n \leq n_1 < n_2 \ldots < n_k \leq n++$.

5. The silicon-based modulator of claim 1, wherein the first longitudinal doping profile and the second longitudinal doping profile are different.

6. The silicon-based modulator of claim 1, wherein one or more of the first longitudinal doping profile and the second longitudinal doping profile are periodic in the longitudinal direction.

7. The silicon-based modulator of claim 1, wherein one or more of the first longitudinal doping profile and the second longitudinal doping profile are aperiodic in the longitudinal direction.

8. The silicon-based modulator of claim 1, wherein one or more of the first longitudinal doping profile and the second longitudinal doping profile have a doping concentration adjacent to a corresponding electrical contact region equal therewith.

9. The silicon-based modulator of claim 1, wherein one or more of the first longitudinal doping profile and the second longitudinal doping profile have a doping concentration adjacent to the waveguide core equal therewith.

10. The silicon-based modulator of claim 1, wherein the variation of doping concentration mimics a lateral doping profile with constant longitudinal profile that is determined based on lower optical losses for a given access resistance or based on lower access resistance for a given optical loss.

11. A method comprising:
providing a silicon-based modulator that includes
a waveguide core that is a PN junction region;
a first transition zone that is a P-side region adjacent to the waveguide core, the first transition zone has a first longitudinal doping profile; and
a second transition zone that is an N-side region adjacent to the waveguide core on an opposite side as the first transition region, the second transition zone has a second longitudinal doping profile;
wherein at least one of the first longitudinal doping profile and the second longitudinal doping profile has a variation of doping concentration along a longitudinal direction that extends a length parallel to the waveguide core and first and second electrical contacts.

12. The method of claim 11, wherein the variation of doping concentration is formed by a plurality of areas of different doping concentrations in the longitudinal direction.

13. The method of claim 11, wherein the waveguide core has a p-type doping of p and the first electrical contact has a p-type doping of p++ such that the first transition zone has k (k≥2) divisions $P_1, P_2, \ldots P_k$, each division effectively uniformly doped at a concentration level $p_1, p_2, \ldots p_k$, respectively, such that $p \leq p_1 < p_2 \ldots < p_k \leq p++$, and wherein the waveguide core has an n-type doping of n and the second electrical contact has an n-type doping of n++ such that the second transition zone has k (k≥2) divisions $N_1, N_2, \ldots N_k$, each division effectively uniformly doped at a concentration level $n_1, n_2, \ldots n_k$, respectively, such that $n \leq n_1 < n_2 \ldots < n_k \leq n++$.

14. The method of claim 11, wherein the first longitudinal doping profile and the second longitudinal doping profile are different.

15. The method of claim 11, wherein one or more of the first longitudinal doping profile and the second longitudinal doping profile are periodic in the longitudinal direction.

16. The method of claim 11, wherein one or more of the first longitudinal doping profile and the second longitudinal doping profile are aperiodic in the longitudinal direction.

17. The method of claim 11, wherein one or more of the first longitudinal doping profile and the second longitudinal doping profile have a doping concentration adjacent to a corresponding electrical contact region equal therewith.

18. The method of claim 11, wherein one or more of the first longitudinal doping profile and the second longitudinal doping profile have a doping concentration adjacent to the waveguide core equal therewith.

19. A silicon-based modulator with an optimized longitudinal profile formed by a process comprising the steps of:
determining an input profile for lateral doping in a transition region in the silicon-based modulator, the transition region between a waveguide core and an electrical contact region, the input profile for the transition region is uniformly doped in an optical propagation direction that is a longitudinal direction that extends a length parallel to the waveguide core and electrical contact region;
defining a number of implantation steps and associated dopant concentrations; and
at each position along a lateral direction, determining an output profile dopant in the longitudinal direction such that its average is equal a dopant concentration of the input profile at a same lateral position.

20. The silicon-based modulator of claim 19, wherein the input profile is determined based on lower optical losses for a given access resistance or for based on lower access resistance for a given optical loss.

\* \* \* \* \*